United States Patent
Shnelvar

(12) 
(10) Patent No.: US 6,374,266 B1
(45) Date of Patent: Apr. 16, 2002

(54) METHOD AND APPARATUS FOR STORING INFORMATION IN A DATA PROCESSING SYSTEM

(76) Inventor: Ralph Shnelvar, 1333 King Ave., Boulder, CO (US) 80302

( * ) Notice: Subject to any disclaimer, the term of this patent is extended or adjusted under 35 U.S.C. 154(b) by 0 days.

(21) Appl. No.: 09/360,852

(22) Filed: Jul. 24, 1999

Related U.S. Application Data

(60) Provisional application No. 60/094,724, filed on Jul. 28, 1998.

(51) Int. Cl.[7] .............................................. G06F 17/30
(52) U.S. Cl. ...................................... 707/204; 711/162
(58) Field of Search ................................. 707/200–204, 707/100–102, 1–6; 711/161, 162

(56) References Cited

U.S. PATENT DOCUMENTS

| | | | | |
|---|---|---|---|---|
| 5,764,972 A | * | 6/1998 | Crouse et al. .................. | 707/1 |
| 5,765,165 A | * | 6/1998 | Harper ........................ | 707/104 |
| 5,778,395 A | * | 7/1998 | Whiting ....................... | 707/204 |
| 5,815,718 A | * | 9/1998 | Tock .............................. | 717/5 |
| 5,832,520 A | * | 11/1998 | Miller ......................... | 707/203 |
| 5,907,672 A | * | 5/1999 | Matze et al. ................... | 714/8 |
| 6,058,392 A | * | 5/2000 | Sampson et al. .............. | 707/6 |
| 6,119,209 A | * | 9/2000 | Bauman et al. ............. | 711/162 |

* cited by examiner

Primary Examiner—Hosain T. Alam
(74) Attorney, Agent, or Firm—Gary D. Clapp, Esq.

(57) ABSTRACT

A method for storing data from a data source in a storage device of a data repository by reading all source allocation units, restructuring the data into data units having a size corresponding to the repository allocation units, and generating a hash value for the data of each data unit read from the data source. For each data unit, a data table is searched for a table entry having a matching hash value wherein each table entry contains the hash value of a data unit stored in a repository allocation unit and a repository allocation unit pointer to the corresponding repository allocation unit. When the hash value of a data unit does not match any hash value of any table entry in the data table, the data of the data unit is written into a newly allocated repository allocation unit a new table entry is written to the data table. When the hash value of a data unit matches the hash value of a data entry in the data table, the data of the corresponding repository allocation unit and is compared with the data of the data unit. If the data of the data unit matches the repository allocation unit, the data unit is discarded. If the data of the data unit does not match the corresponding repository allocation unit, the data unit is written into a newly allocated repository allocation unit and a new table entry is inserted into the data table.

21 Claims, 10 Drawing Sheets

METHOD AND APPARATUS FOR STORING INFORMATION IN A DATA PROCESSING SYSTEM

CROSS REFERENCES TO RELATED APPLICATIONS

The present Application claims the benefit of U.S. Provisional Application No. 60/094,724, filed Jul. 28, 1998 by the same inventors as the present Application and directed to the same invention and containing the same disclosure as the present Application.

FIELD OF THE INVENTION

The present invention relates to a method for storing information in a data processing system and, in particular, to a method for compressing and storing information in a data processing system.

BACKGROUND OF THE INVENTION

A recurring problem in computer based data processing systems is the storing of information, such as data files, application programs and operating system programs, particularly as the size and number of program and data files continues to increase. This problem occurs in single user/single processor systems as well as in multi-user/multi-processor systems and in multi-processor networked systems and may occur, for example, in the normal operation of a system when the volume of data and programs to be stored in the system exceeds the storage capacity of the system. The problem occurs more commonly, however, in generating and storing "backup" or archival copies of a system's program and data files. That is, the backup copies are typically stored in either a portion of the system's storage space or in a separate backup storage medium, either of which may, for practical considerations, have a storage capacity smaller than that of the system, so that the volume of information to be stored may exceed the capacity of the backup storage space. Again, this problem occurs commonly in single user systems, and is even more severe in multi-user/multi-processors systems and in networked systems because of the volume of data generated by multiple users and because such systems typically contain multiple copies of application programs and operating system programs, which are frequently very large.

The problem may be alleviated by the use of "chapterized" backup systems which make periodic copies of all data files, and often the program files, on a system such that the exact state of the system at any given time can be regenerated from the appropriate backup chapter. In this method, therefore, and while a file that has been deleted from the system will not appear in subsequent backup chapters, files having different names but identical contents will apparently appear more than once in the underlying data.

Traditional methods for storing information, and in particular for storing backup or archival copies of data and program files have offered little relief for this problem. For example, the sector copy method for making backup copies of files on disk drives merely copies the contents of a disk drive, sector by sector, into another storage medium, such as another disk drive or a tape drive. This method therefore not only does not reduce the volume of data to be stored, but, because the copying is on the basis of disk drive sectors, does not permit the stored information to be accessed and restored on the basis of files and directories.

The prior art has therefore evolved and offered a number of "data compression" schemes for dealing with this problem by reducing the volume of the data or program files to be stored while retaining the information contained in those files. These schemes have generally used either of two basic classes or groups of data compression methods. The first group of methods, which may be referred to as intra-file methods, searches within individual bodies of streams of data to eliminate or reduce redundant data within each individual file. The second group of methods, which may be referred to as inter-file methods, searches across streams or bodies of data to eliminate or reduce redundancy between files in a system as entities, that is, to eliminate files that are duplicates of one another.

Broadly, the prior art can also be classified as including intra-file methods such as PKZIP, ARC, and LHZ, inter-file methods based on file and directory names such as TAPE-DISK's TAPEDISK® system, and inter-file methods based on file content such as the STAC, Inc. REPLICA® system.

The intra-file methods, of which there are many variations, recognize that the form in which data is expressed in a file typically uses more information bits than are actually required to distinguish between one element of data and another, and that the data can be reduced in volume by an encoding method that reduces the proportion of unnecessary or redundant data bits. For example, text is frequently expressed in ASCII or EBCDIC code, which uses character codes of a uniform size, typically seven or eight bits, to express the different characters or symbols of the text. For example, some text compression methods recognize that certain characters or symbols or combinations or sequences of characters of symbols occur more frequently than others, and assign shorter codes to represent more frequently occurring characters or combinations of characters and use longer codes only for rarer characters or combinations of characters.

Intra-file methods generally make use of a so-called "dictionary". The dictionary contains a mapping between a short sequence of bits and a long sequence of bits. Upon decompression, for each different short sequence of bits, the short sequence is looked up in the dictionary and the corresponding longer sequence of bits is substituted.

Intra-file methods are widely used and are often implemented as computer system utility programs, such as PKZIP, and certain systems, such as certain versions of Microsoft Windows, have included zip-like compression programs as operating system utilities wherein a user may partition a section of a disk drive as an area to read, write and store compressed files. It must be recognized, however, that intra-file methods, such as zip compression, do not address many of the problems of data storage, and are at best only a partial solution to this problem. For example, intra-file methods such as zip compression often provide little compression with files such as graphics files wherein the proportion of redundant bits is much less than in text type files. In addition, intra-file methods of compression inherently depend upon the internal relationships, such as redundancy, between the data elements of a file to compress or reconstruct files. As such, intra-file methods generally cannot detect or reduce redundancy in the data between two or more files because the size of the dictionary becomes so large as to not be practical to use and are therefore generally limited to operating on files individually, so that these methods cannot detect and eliminate redundancy even between files that are literal duplicates of one another and cannot reduce the number of files to be stored.

The inter-file methods, of which there are again many variations, search for files whose contents are essentially duplicates of one another and replaces duplicate copies of a file with references to a single copy of the file that is retained and stored, thereby compressing the information to be stored by eliminating multiple stored copies of files. It will be appreciated, however, that these methods again do not address certain significant problems, and in fact present difficulties arising from their inherent characteristics.

For example, there are two primary methods for identifying duplicate copies of a given file. The first is by examination of external designators, such as file name, version number, creation/modification date and size, and the second is by examination and comparison of the actual contents of the files. Identification of duplicate copies of files by examination of external designators, however, may not identify duplicate copies of files or may misidentify files as duplicates when, in fact, they are not. For example, a given user may rename a file to avoid confusion with another file having a similar name or to make the file easier for that user to remember, so that the file would appear externally to be different from other copies of the file, even though it is a duplicate of the other copies of the file. Also, certain external designators, such as file modification date, are inherently unreliable for at least certain types of files. In the reverse, a user may modify or customize a given file, often referred to as "patching a file", as is provided for, for example, in certain system utility programs, and the fact of that modification or customization may not appear in the external designators examined by the file comparison utility, so that the file could appear, from its external designators, to be a copy of another file when in fact it is not. For example, a user may use the MSDOS® XCOPY command to copy a directory from one disk to another. Should some program patch one of the files that has been copied, a program relying on external designators would assert that the two directories have identical contents, whereas such would not be the case.

Examination of the actual contents of files to determine whether the files are duplicates of one another, while being a more reliable method for determining whether two or more files are, in fact, duplicates of one another, is generally slow and cumbersome. That is, each time that a file is added to the archive, or backup facility, the contents of that file must be compared with the contents of all files previously stored in the archive or backup facility. It will be appreciated that if this comparison is performed on a data element by data element basis, the addition of even a single file to the archive will be a tedious process. As such, the file content comparison methods may be modified by performing an initial examination and comparison of the external designators, such as file name, version number, creation/modification date and size, of a new file and the previously stored files to obtain an initial determination of the probability that the new file may be a duplicate of a previously stored file. Again, however, a preliminary determination of possible identity between files by examination of external indicators may result in a failure to identify duplicate copies of files, so that the duplicate files are not eliminated, or a misidentifications files as duplicates when they are not, which results in lost processing time when the contents of the files are compared.

It should be noted with regard to inter-file compression methods that certain utilities known in the prior art, for example, in the OS-9 operating system developed by Microwave Systems Corporation for MC 6809 and 680XX processors, attempted to provide an externally accessible designator that represented the actual contents of a file and, in particular, program modules. In this instance, an operating system utility used a hash algorithm to generate a value, in this case a Cyclical Redundancy Check (CRC) algorithm, and a linker to add a header and footer to a compiled program module wherein the header contained the module name and a hash value representing module name and size and the footer contained a hash value on the entire module. Additional utilities allowed the hash values to be updated periodically. The hash values were then used when a new program module was added to a system to check whether there was already a program module having the same name and hash values, and prevented the installation of the new module if a match was found.

This method has not been used in inter-file compression to represent the actual contents of files for comparison of file contents, however, for a number of reasons. One reason is that the method is useful, for practical reasons, only with program modules or other forms of files that do not change frequently. That is, there is a high probability that the hash values representing the contents of a data file or any other form of file that changes frequently would be outdated at any given time and thus would not represent the actual contents of the file, so that a comparison with another file would be invalid. This would require the regeneration of the hash values each time a file was to be compared to other files, which would slow the operation of the backup/archiving system to an impractical extent, particularly for large files. Yet another theoretical problem in using hash values on the contents of files to represent the actual contents of files for comparison purposes is what is referred to as the "counting argument", which essentially states that it is mathematically impossible to represent an arbitrary bit stream of any length greater than M with a value, such as a hash value, having a fixed number of bits N, wherein the value N is a function of the value M and N is less than M. Stated another way, the representation of a bit stream of length M by a value having N bits, denoted as H(N) is a compression of the bit stream and it is impossible to perform a lossless compression of a bit stream of length greater than M into a bit stream having a length N for all possible bit streams of length M. In terms of intra-file compression methods, this means that, in general, the contents of a file cannot be represented uniquely in order to avoid the occurrence of the same hash value for two files having, in fact, different contents. The result of such an erroneous comparison if an inter-file compression system would be the loss of the data in one of the files.

Lastly, it should be noted that file backup and archiving systems frequently have yet another related limitation that can become a significant problem, particularly as file sizes become ever larger and especially in multi-user/multi-processor systems where large volumes of data must be stored in a backup or archive facility. That is, file backup and archiving systems store files as files, using either their own file structures and utilities or the file structures of the system in which they operate, and typically store each backup of a system's files as, or in, a single file. File management systems, however, typically impose a limit on the maximum size of files, especially in "disaster recovery"environments, and this size may be exceeded by the cumulative volume of the files to be backed up in a single backup operation. This, in turn, may require that a backup be performed as multiple partial backups, with increased administrative and processing burdens and decreases in the overall efficiency of whatever file compression method are being used as file compression methods generally cannot be effectively applied across backup operations.

The above discussed limitations of the prior art methods for storing of backing-up data may be further illustrated by reference to specific examples. For example, the method described in U.S. Pat. No. 5,778,395 backs up data from multiple nodes of computer networks, but does so on the basis of file names. A comparison of file name designations however, as discussed above, does not reflect the actual form of data on disks, which, for MSDOS/Windows systems, is generally in the form of clusters. As such, this method cannot duplicate the actual organization of data on disks, which is in clusters (plus some system-related data with is stored as sectors-outside-of-clusters). The method used in the TAPEDISK® system produced by TAPEDISK, Inc. compresses data by removing duplicate clusters, but does so by comparison of file names to identify duplicate files. As such, the TAPEDISK method, being based on file designators rather than on cluster contents, does not eliminate duplicate data contained in clusters which may be in files with different names. This method may also fail to identify files having duplicate contents but different names, or may identify two files having the same name but different contents as duplicates. The JAR™ product, by ARJ Software, Inc., is a command line archiver similar to PKZIP®, but provides delta compression of files by performing chapter archiving according to specified file lifespans. That is, JAR™ begins with an archival copy of the files in a file system, for example, a directory, and thereafter adds "chapters" containing copies of only those files or portions of files that may have changed since the last archival copy. Again, this method, not being based on clusters or the contents of the actual clusters, cannot duplicate the organization of data on disks, which is in sectors/clusters, and may err by duplicating unchanged files or by not duplicating changed files as the archiving decision is based on the names and attributes of files, such as file name, file modification date, and so forth, rather than on the contents of the files and changes therein. Further, JAR™ cannot replicate the non-file data exactly. That is, JAR™ has no means of accessing the on-disk data structures like directories and File Allocation Tables.

Finally, the STAC, Inc. REPLICA® system, which is described in U.S. Pat. No. 5,907,672, provides a method by which a tape drive can be used to simulate a mountable file system known to, for example, Netware or DOS. It is well known and understood that locating and reading a specific, selected body of data from a tape unit, such as to compare the previously stored data with newly received data, is a very slow process and limits the speed of operation of a tape based system severely. The REPLICA™ system is a tape based archiving system very similar to the aforementioned TAPEDISK wherein the speed of operation of the system is increased by reducing the number of accesses to archived blocks of data on the tape. At each archiving operation the system generates a checksum for each block of data, such as a cluster or allocation unit, read from a data source and compares the new checksum with a stored checksum generated for the block of data from the same location in the data source in the previous archiving operation. If the checksums do not match, the data may have changed and the system reads the previously stored block of data from that location from the tape, compares it to the current block of data and writes the current block of data to tape if the data has changed. The method used in the REPLICA® system in U.S. Pat. No. 5,907,672 thereby uses checksums only to identify whether the data at a given location in a data source has changed, and not as identifiers to eliminate duplicate data across all blocks of data on the data source.

The data compression methods of the present invention provide a solution to these and other problems of the prior art.

SUMMARY OF THE INVENTION

The present invention is directed to a method for storing data from a data source in a storage device of a data repository in a computer system that includes at least one data source wherein data is stored in source allocation units.

According to the present invention, the method is performed by reading all source allocation units, which may be clusters or sectors of a storage device, restructuring the data into data units having a size corresponding to the repository allocation units, and generating a hash value for the data of each data unit read from the data source. When each data unit read from the data source, a data table is searched for a table entry having a hash value matching a hash value of the data unit read from the data source wherein each table entry contains the hash value of a data unit stored in a repository allocation unit and a repository allocation unit pointer to the corresponding repository allocation unit. When the hash value of a data unit does not match any hash value of any table entry in the data table, the data of the data unit is written into a newly allocated repository allocation unit, and generates a new table entry containing the hash value of the data unit and a repository allocation unit pointer to the newly allocated repository allocation unit is generated and written to the data table. When the hash value of a data unit matches the hash value of a data entry in the data table, the table entry having a matching hash value is accessed and the repository allocation unit pointer therein is used to read the data of the corresponding repository allocation unit and the data of the corresponding repository allocation unit are compared to the data unit. If the data of the data unit matches the data of the corresponding repository allocation unit, the data unit is discarded and, if the data of the data unit does not match the data of the corresponding repository allocation unit, the data of the data unit is written into a newly allocated repository allocation unit and a new table entry containing the hash value of the data unit and a repository allocation unit pointer to the newly allocated repository allocation unit is generated and inserted into the data table.

When we write that the data of the incoming data unit is discarded, we mean that the data is discarded only insofar as the contents of the clusters or sectors are replaced by a pointer to the already existing data in the repository. Clearly, the incoming data unit may have two identifiers, the data content and the sector/cluster number that will be assigned to this incoming data unit. The sector/cluster number is not discarded but is stored externally in some table and this table is external to the method herein described. For instance, in the TAPEDISK® software, a similar table is called the "Cluster Relocation Table."

In a presently preferred embodiment of the invention, the data table is partitioned into data records wherein each data record contains an array of table entries containing at least one table entry. In this embodiment, the step of searching a data table for a table entry having a hash value matching that of a new data unit includes the steps of fetching a first/next data record and determining whether the fetched first/next data record is the last data record of a linked list of one or more data records in the data table wherein the last data record of the data table is not sorted according to the hash values represented therein.

When the fetched first/next data record is not the last data record of the data table, the present invention determines whether the hash value of the newly received data unit is smaller than the hash value of the first table entry of the data record and, when the hash value of the newly received data unit is smaller than the hash value of the first table entry, selects a first/next data record. When the hash value of the newly received data unit is not smaller than the hash value of the first table entry, the present invention determines whether the hash value of the newly received data unit is larger than the hash value of the last table entry of the data record and, when the hash value of the newly received data unit is larger than the hash value of the last table entry of the data record, again selects a first/next data record. When the hash value of the newly received data unit is not larger than the hash value of the last table entry of the data record, the present invention performs a binary search to find a match between the hash value of the newly received data unit and the hash value of a table entry in the data record, and when a match is not found, adds a new entry to the data table or, when a match is found, discards the new data unit.

When the fetched data record is the last data record of the data table, the present invention performs a linear search to find a match between the hash value of the newly received data unit and the hash value of a table entry in the data record. When a match between the hash value of the newly received data unit and the hash value of a table entry in the data record is not found, a new entry to the data table is created and entered and, when a match is found, the new data unit is discarded.

In those implementations of the present invention wherein the data table is partitioned into data records wherein each data record contains an array of table entries containing at least one table entry, the step of inserting a new table entry into the data table includes the steps of determining whether a data record exists to receive the table entry of the newly received data unit and, if a data record does not exist to receive the table entry, creating a new data record to receive the table entry of the newly received data unit. If a data record exists to receive the table entry, the present invention determines whether the data record has space to receive a new table entry and, if the data record has space to receive a new table entry, inserts the new table entry into the last data record of the data table. If the data record does not have space to receive a new table entry, the present invention sorts the last data record according to the hash values of the record entries appearing therein, creates a new data record to be a new last data record of the data table, and links the new last data record to the chain of one or more data records of the data table;

Considering the operations performed by the present invention in further detail, upon identifying a match between the hash value of a new data unit and a hash value already represented in the data table, the present invention determines whether there is sufficient room in a suspense array to insert a new suspense element wherein the suspense array includes one or more suspense elements and a suspense element contains the data of a new data unit having a hash value that matches the hash value of a table entry residing in the data table. If there is room in the suspense array to insert a new suspense element, the present invention inserts the new suspense element into the suspense array.

If there is not room in the suspense buffer to insert a new suspense element, the present invention flushes the suspense buffer by reading each suspense element of the suspense array and, for each suspense element, accesses the table entry having a matching hash value and uses the repository allocation unit pointer therein to read the data of the corresponding repository allocation unit. The data of the data unit represented by the suspense element and the data of the corresponding repository allocation unit are compared and if the data of the suspense element matches the data of the corresponding repository allocation unit, the data unit is discarded. If the data of the suspense element does not match the data of the corresponding repository allocation unit, the data of the data unit is written into a newly allocated repository allocation unit, and a new table entry containing the hash value of the data unit and a repository allocation unit pointer to the newly allocated repository allocation unit is generated and inserted into the data table.

According to a presently preferred embodiment of the invention, the method for flushing the suspense array includes the steps of sorting the suspense array by the repository allocation unit pointers to the repository allocation units of the suspense elements in the suspense buffer, allocating a flushing buffer to store at least one of the suspense elements stored in the suspense array, setting a suspense array index pointer to point to the first sorted suspense element, reading suspense elements from the repository into the flushing buffer, starting with the suspense element indicated by the suspense array index pointer, and processing each allocation unit corresponding to each suspense element in the flushing buffer.

The processing of each allocation unit corresponding to a suspense element includes the steps of comparing the data of the data unit represented by a suspense element and the data of the corresponding repository allocation unit and, if the data of the suspense element matches the data of the corresponding repository allocation unit, discarding the data unit. If the data of the suspense element does not match the data of the corresponding repository allocation unit, the data of the data unit is written into a newly allocated repository allocation unit and a new table entry containing the hash value of the data unit and a repository allocation unit pointer to the newly allocated repository allocation unit is generated and inserted into the data table. After each suspense element in the flushing buffer is processed, the suspense array index pointer is advanced to the next suspense array entry representing a suspense element in the suspense buffer that has not been processed, and this process is repeated until there are no more suspense elements in the flushing buffer to be processed.

The method for determining whether the data of a suspense element matches the data of a data unit already represented in a table entry of a data table and residing in a repository allocation unit includes comparing the contents of a data unit represented in a suspense element with the contents of a data unit already residing in a repository allocation unit and represented in a table entry of a data table. If the contents of the data unit in the suspense element match the contents of the data unit already residing in a repository allocation unit and represented in a table entry, the data unit in the suspense element is discarded. If the contents of the data unit in the suspense element do not match the contents of the data unit already residing in a repository allocation unit and represented in a data record, the data of the data unit is written to a newly allocated repository allocation unit and a corresponding table entry containing the hash value of the data unit and a repository allocation unit pointer to the location of the data unit in the newly allocated repository allocation unit is added to the data table.

In yet further embodiments of the present invention, the present invention may be embodied as a data compression mechanism for storing data from a data source in the storage device of a data repository in compressed form by eliminating duplicate clusters of the data source. In this implementation, the data compression mechanism includes a restructuring mechanism for reading data from the source allocation units and restructuring the data into data units having a size corresponding to the repository allocation units, a hash generator for generating a hash value for the data of each data unit read from the data source, and a table search mechanism responsive to each new data unit read from the data source for searching a data table for a data record having a record entry having a hash value matching a hash value of the data unit read from the data source. The data table includes at least one data record and each data record contains the hash value of a data unit stored in a repository allocation unit and a repository allocation unit pointer to the corresponding repository allocation unit. A storage manager is responsive to operation of the table search mechanism for writing a newly received data unit into a newly allocated repository allocation unit when the hash value of the newly received data unit does not match a hash value of a record entry in a data record, and a table generator responsive to operation of the table search mechanism for generating a new record entry containing the hash value of the newly received data unit and a repository allocation unit pointer to the newly allocated repository allocation unit and writing the new record entry into a data record.

The data compression mechanism also includes a suspense processor responsive to operation of the table search mechanism for writing the data of the newly received data unit and the corresponding hash value into a suspense element of a suspense buffer when the hash value of a newly received data unit matches the hash value of a record entry in a data record. For each suspense element, the suspense processor accesses the record entry having a matching hash value and using the repository allocation unit pointer therein to read the data of the corresponding repository allocation unit and compares the data of the data unit and the data of the corresponding repository allocation. If the data of the data unit matches the data of the corresponding repository allocation unit, the suspense processor discards the data unit, and if the data of the data unit does not match the data of the corresponding repository allocation unit, the suspense processor indicates the mismatch to the storage manager and the table generator. The storage manager is responsive to the suspense processor for writing the data of the data unit into a newly allocated repository allocation unit, and the table generator is responsive to the suspense processor for generating a new record entry containing the hash value of the data unit and a repository allocation unit pointer to the newly allocated repository allocation unit and writes the new record entry into a data record.

The present invention may also be implemented in a mass storage device for storing data unit received from at least one data source and including a storage element for storing the data and a controller for controlling the storing of data in storage allocation units of the storage element, again operating as a data compression mechanism for storing the data in compressed form by eliminating the storing of duplicate data units. In the implementation, the mass storage device includes a hash generator for generating a hash value for the data of each data unit received by the mass storage device and a table search mechanism responsive to each new data unit for searching a data table for a table entry having a hash value matching the hash value of the new data unit wherein each table entry contains the hash value of a data unit stored in the storage element and an indicator of the storage allocation unit containing the data unit. A storage manager of the mass storage device is responsive to operation of the table search mechanism for writing a newly received data unit into a newly allocated storage allocation unit of the storage element when the hash value of the newly received data unit does not match a hash value of a table entry, and discarding the newly received data unit when the hash value of the newly received data unit matches a hash value of a table entry. The mass storage device also includes a table generator responsive to operation of the table search mechanism when the hash value of the newly received data unit does not match a hash value of a table entry for generating a new table entry containing the hash value of the newly received data unit and an indicator of the newly allocated storage allocation unit containing the newly received data unit and writing the new record entry into the data table.

The mass storage device may also include a suspense processor responsive to operation of the table search mechanism for writing the data of the newly received data unit and the corresponding hash value into a suspense element of a suspense buffer when the hash value of a newly received data unit matches the hash value of a table entry. The suspense processor processes each suspense element by accessing the table entry having a matching hash value and using indicator of the storage allocation unit containing the data unit therein to read the data of the corresponding repository allocation unit and comparing the data of the data unit and the data of the corresponding repository allocation. If the data of the data unit matches the data of the corresponding repository allocation unit the data unit is discarded and, if the data of the data unit does not match the data of the corresponding repository allocation unit, the mismatch is indicated to the storage manager and the table generator. The storage manager is then responsive to the suspense processor for writing the data of the data unit into a newly allocated repository allocation unit, and the table generator is responsive to the suspense processor for generating a new record entry containing the hash value of the data unit and an indicator of the newly allocated storage allocation unit containing the data unit and writing the new table entry into the data table.

The method of the present invention also includes the method for reading, recovering, or restoring data from a data repository by mounting the contents of the repository allocation units of a data repository into a system as a restored disk volume having a directory structure identical to that of the data source and accessing files on the restored disk volume from a software application using file system input/output calls.

In one implementation of a mass storage device embodying the present invention, the mass storage device is a disk drive includes at least one magnetic disk storage element and the repository allocation units are sectors of the magnetic disk storage element.

In still further embodiments of the present invention, the hash generator and table lookup mechanisms are embodied by associative array hardware.

In yet other embodiments of the present invention, the repository allocation units are organized into one or more containers wherein each container is organized into one or more compartments and each compartment includes one or more repository allocation unit. The embodiment may also include a compartment set file associated with a container wherein the compartment set file contains a list of compartments that are to be treated as a single file.

Finally, in yet another embodiment of the present invention a repository allocation unit pointer is a byte offset of the location of a repository allocation unit from the beginning of the repository allocation units in the storage device of the data repository.

DESCRIPTION OF THE DRAWINGS

The foregoing and other objects, features and advantages of the present invention will be apparent from the following description of the invention and embodiments thereof, as illustrated in the accompanying figures, wherein.

DESCRIPTION OF THE INVENTION

A. Introduction (FIG. 1)

Figure 1:
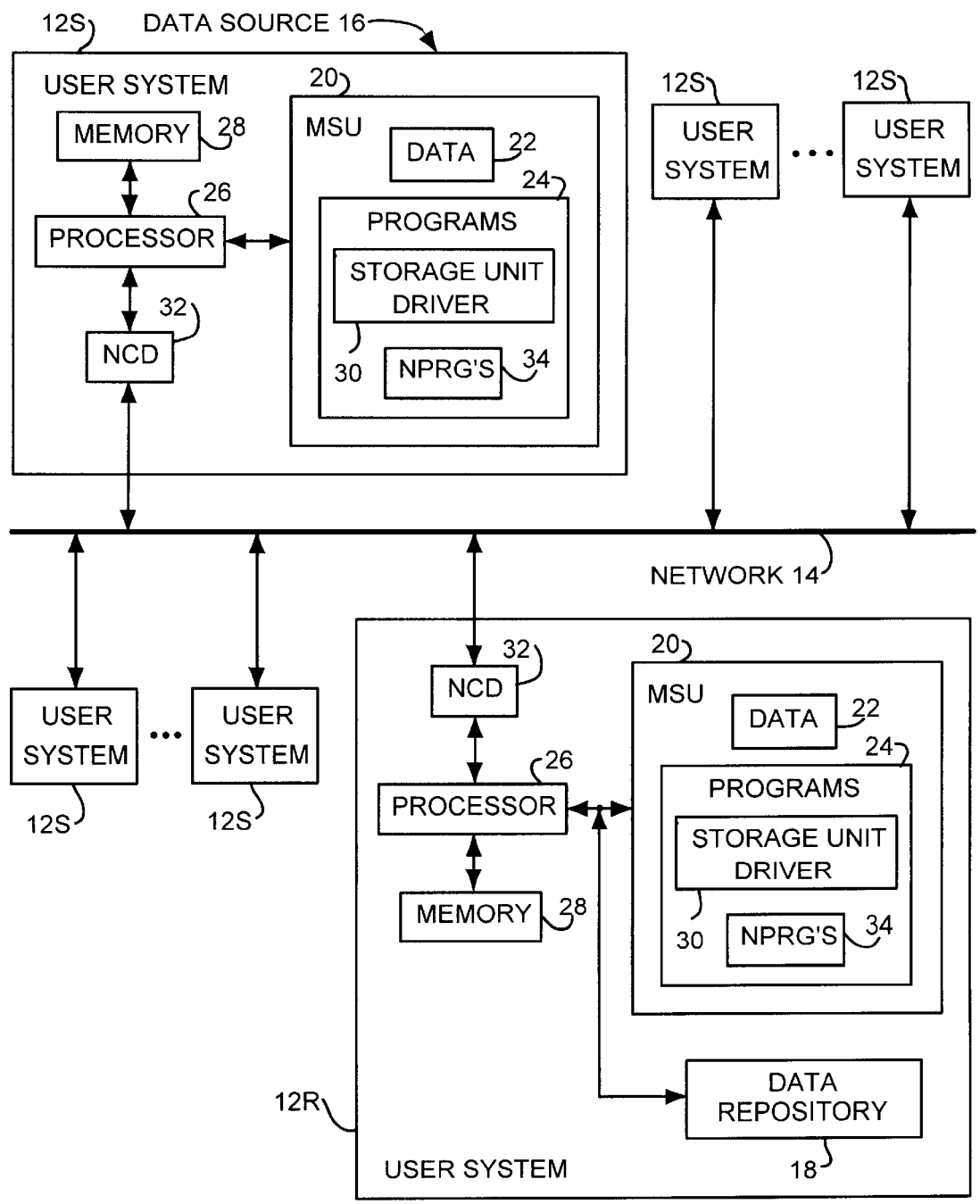
FIG. 1 is a block diagram of a system incorporating the present invention.

Referring to FIG. 1, therein is illustrated a System 10 incorporating the present invention. As shown therein, System 10 may include a plurality of User Systems 12 interconnected by Network 14 wherein two of User Systems 12, designated as User Systems 12S and 12R, are represented in additional detail to illustrate the present invention. In this regard, User System 12S represents a Data Source 16 containing data, that is, a collection of clusters and other sector-level data that likely represent data and program files, and directory information, that are to be stored in compressed form in a Data Repository 18 residing in a designated or selected User System 12R. It should be noted that Systems 12R and 12S could be physically the same system. It should also be noted that that User System 12R could be, for example, a so-called "Network Server", and that the present invention is equally applicable in both peer-to-peer networks and server-based networks.

As shown, each of User Systems 12S and 12R typically include a Mass Storage Unit (MSU) 20, such as a disk drive, for storing Data 22 and Programs 24, a Processor 26 for performing operations on Data 22 and otherwise executing operations as directed by Programs 24, and a Memory 28 for temporarily holding Data 22 and Programs 24 currently being operated upon or executed by Processor 26. It will be noted, and well understood by those of ordinary skill in the relevant arts that Programs 24 will typically include a Storage Unit Driver 30, such as a disk driver program, for controlling the reading and writing of Data 22 and Programs 24 from and to MSU 18. Each User System 12 will typically include a Network Communication Device (NCD) 32 and Network Programs NPRGs) 34 for communicating with one another through Network 14 in, for example, peer-to-peer and server based networked system. It will be understood, however, that NPRGs 34 and NCDs 32 may not be required when User System 12R and User System 12S are the same system or node of a networked system.

As will be understood from the following descriptions, the functions and operations of the present invention are to provide a mechanism whereby Data 22 or Programs 24 or Data 22 and Programs 24 or sector-level data may be copied or read from a Data Source 16, such as the MSU 20 of a User System 12S and stored in compressed form in a Data Repository 18, such as the MSU 20 of a User System 12R. These functions of the present invention may be used, for example, in generating an archival or backup copy of the data and programs residing in the Data Source 16. It will be farther understood that, as in the present example, the User System 12R containing Data Repository 18 may access and read the Data 22 and Programs 24 of a Data Source 16 using methods and devices well understood in the art, such as NCDs 32, NPRGs 34 and Storage Unit Drivers 30, and calls or commands to a User System 12R through Network 14. Equivalently, User System 12S could write its own data into the MSU 20 of a User System 12R, using standard network protocols. It will also be understood that these functions and operations may be performed within a single User System 12, whereby a User System 12 may generate compressed copies of the Data 22 and Programs 24 residing on its own MSU 20 and store the compressed copies in a Data Repository 18 comprising, for example, its own MSU 20 or another storage device, such as a second MSU 20, a "floppy disk" drive, a CD drive or a tape drive.

2. General Discussion of Files and File Managers (FIG. 2)

Before continuing with the description of the invention, it will be advantageous to review the organization and management of data and programs as files in typical mass storage devices, such as disk drives, for purposes of defining terms used in the following descriptions. The discussion of the organization and management of files will be brief as it will be recognized that the organization and management of files in a system is well understood by those of ordinary skill in the relevant arts, although there are a myriad of well recognized and established methods for organizing and managing files in a system of files.

Figure 2:
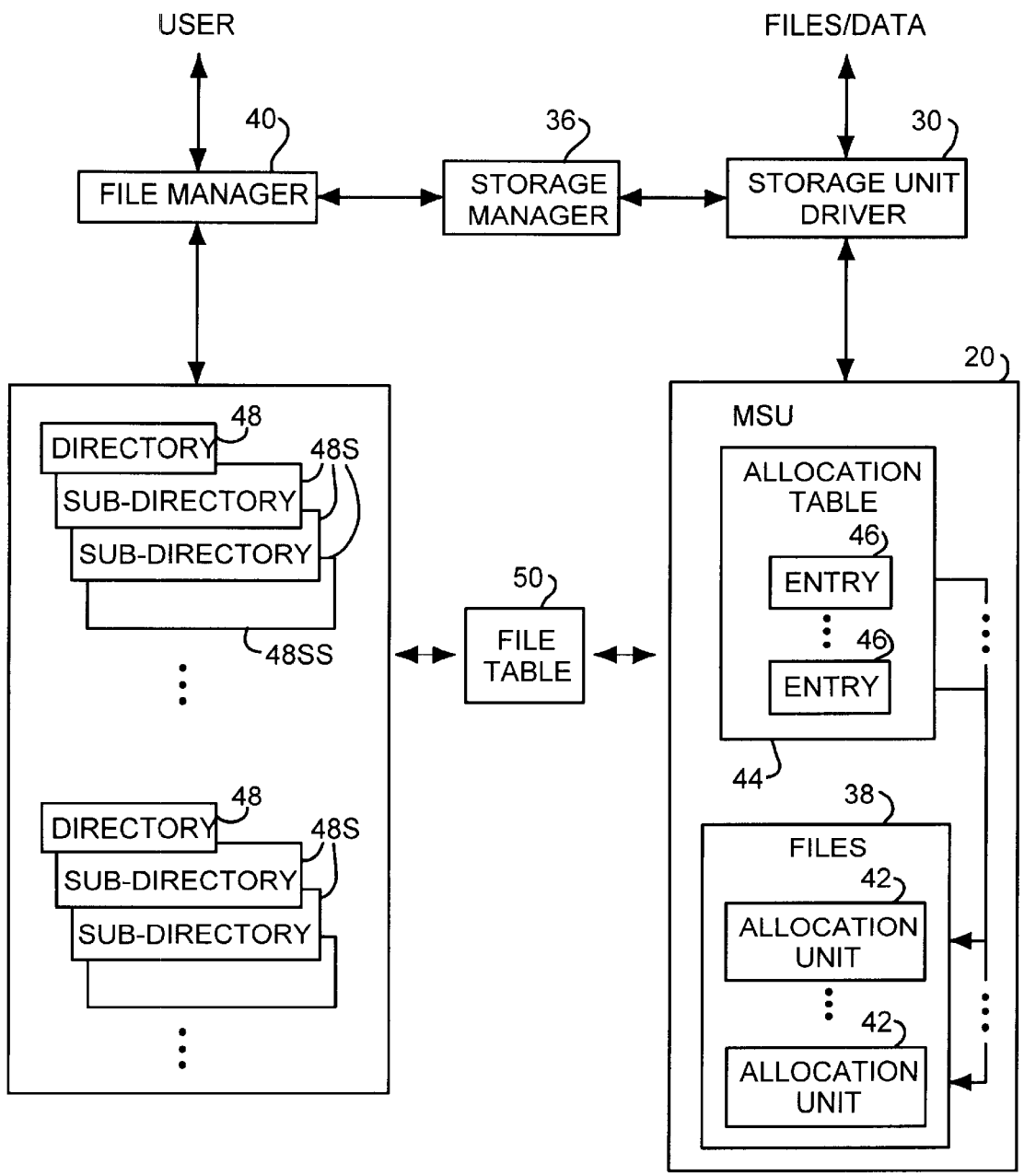
FIG. 2 is a diagrammatic representation of the file structures and mechanisms of the system.

Referring to FIG. 2, therein is illustrated a general system for organizing and managing files in a system that is typical and illustrative of the great majority of file and disk management systems and that would be commonly implemented in User Systems 12S and 12R as illustrated in FIG. 2. As shown therein, the two primary components of a file and disk management system are the Storage Manager 36 which controls and manages the storing of Files 38 in a MSU 20, typically acting through a Storage Unit Driver 30, and a File Manager 40 through which the organization of Files 38 and the storage of Files 38 are represented to a user.

For the purposes of the present invention, the phrase "hard disk drive" refers to and is used to mean a device capable of randomly accessing an arbitrary piece data. Thus, for the purposes of this invention, a "hard disk drive" could be a so-called "ram disk" or a "TAPEDISK" or any other hardware and software configuration or device that allows random access to data.

Referring first to Storage Manager 36, it is assumed in the present example that MSU 20 is a hard disk drive, or a hard disk being simulated by other software such as Stacker®, TAPEDISK®, DATMAN® or other software which acts as a hard disk emulator, which is presently the form of MSU 20 most typically found in a User System 12. Storage Manager 36 organizes the storage space of MSU 20 into Allocation Units 42 which may be referred to, for example, as "clusters", "sectors" and so on, and which may be of fixed or variable size, depending upon the particular Storage Manager 36. In Microsoft Disk Operating System (DOS), for example, Allocation Units 42 are referred to as "clusters" and are of fixed size while, for example, in certain "ZIP" file systems the Allocation Units 42 are of variable size. A difference between fixed size allocation units and variable size allocation units, for example, is that the tracking, allocation and management of allocation units is generally less complex in systems employing fixed size allocation units. In contrast, variable size allocation units are more efficient in use of the available storage space as the size of each allocation unit is matched to the size of the data to be stored therein so that all of the storage space in each allocation is used, while unused portions of the allocation units in fixed size allocation unit systems are effectively wasted as "cluster slop".

Storage Manager 36 typically also creates and maintains an Allocation Table 44, which directly or indirectly indicates which Allocation Units 42 are currently allocated to store data or are currently unallocated or are unusable for some reason, such as being located in a bad or faulty disk sector, and relates the Allocation Units 42 containing data of a given file to one another so that the data of a given file can be located. Microsoft DOS, for example, refers to the Allocation Table 44 as a "File Allocation Table", or FAT, and the FAT contains an Entry 46 for and corresponding to each cluster on a disk drive. Each Entry 46 in the Allocation Table 44, in turn, typically contains a designator indicating the current status of the corresponding cluster, such as available, allocated or unusable. In Microsoft DOS, for example, wherein a given File 38F or Directory 38D may occupy one or more clusters, the FAT Entry 46 corresponding to the first cluster containing data of the file contains a designator identifying the next cluster, if any, of the group of clusters allocated to store data from that file or directory. If the file or directory occupies more than one cluster, the FAT entry of each successive cluster allocated to the file or directory contains the designator of the next cluster in the group, so that all of the data of the file or directory may be located by following the chain of cluster designators. Yet other storage manager systems may, for example, chain the allocation units of a file internally, that is, with each allocation table entry containing an identifier of the corresponding allocation unit and an identifier of a next entry corresponding to an allocation unit containing data of the file. It will be appreciated and understood that there are many methods for organizing allocation tables and linking allocation units assigned to Ia given file or directory or other such data stream and that such methods will be well known and understood by those of ordinary skill in the relevant arts. It will also be understood that the present invention, as described in the following, may be readily adapted to use with any storage manager, and that the adaptation of the present invention will be readily understood by those or ordinary skill in the relevant arts.

It must also be understood that certain clusters may not and probably will not be allocated to files. These clusters are allocated by File Manager 40 for File Manager 40's own use for certain "housekeeping" purposes, such as the maintenance of directories for locating files or for the allocation of space for the allocation tables themselves. For example, in the MSDOS FAT file system, space on the MSU 22 must be set aside for the Allocation Table 44 itself.

Referring now to File Manager 40, as described, the function of File Manager 40 is to represent the organization of Files 38 and the storage of Files 3 8 to a user and to provide the user with an interface for interacting with Storage Manager 36 in storing and managing Files 38. In this respect, and although some systems may use different names and terms to refer to files and file organizations, a file, such as a File 38 of the present discussion, may be defined as a body or string or sequence of data comprising a program or data to be operated upon by a program, that is treated as and used as a single entity and is stored as an entity, although, as described above, this entity may physically be stored in the form of one or more allocation units. Files 38 are typically organized into groups of related files, according to a criteria selected by the user, a system administrator or the system, and the groups of Files 38 placed into organizational structures commonly referred to as "directories" and represented in FIG. 2 as Directories 48. It should be noted that most file systems permit the use of a hierarchical directory organization, wherein, as illustrated in FIG. 2, a given Directory 48 may contain one or more sub-Directories 48s and each sub-Directory 48s may contain further sub-Directories 48ss, and so on until the lowest level of Directory 48 contains the group of Files 38. Microsoft Windows and Microsoft DOS, for example, organize data into files and the files are organized in hierarchical directory structures. Yet other systems, such as the commonly used "zip" compression utilities, organize compressed files into "archives" and, if the utility is being used in a Windows or DOS based, the archives are then treated by the Windows/DOS file manager as Files 38.

In yet another form of data organization, a "chapterized" file system superimposes another layer of organization on top of the hierarchical organization described above. In a chapterized system, a particular chapter of a file system, that is, a particular collection of files at some point in time, is known by a chapter name or a chapter number. Generally, chapterized file systems operate at a level above the standard calls to file managers in the operating system.

Lastly in this regard, Storage Manager 36 and File Manager 40 interoperate to relate the directory and file structure constructed by a user of File Manager 40 with the physical storage of Files 38 in Allocation Units 42 on a disk drive by Storage Manager 36. In a typical example, File Manager 40 will represent Files 38 and Directories 48 to a user by means of a displayable graphical representation of the file/directory structure wherein the Directories 48 and Files 38 are identified by names associated with the Directories 48 and Files 38 according to the naming conventions supported by the File Manager 40. In many implementations, the functions to relate Directories 48 and the assigned file and directory names appearing therein to Allocation Units 42 are implemented in Storage Manager 36. In other implementation, however, and for example, File Manager 40 may maintain information in the entries of Directories 48 that relates the assigned directory and file names as represented in Directories 48 to the corresponding Resource Allocation Units 42 and entries in Allocation Table 44, or may store this information in a File Table 50.

To illustrate by an example, when a file is created and stored by Microsoft DOS, the Storage Manager 36 will allocate Allocation Units 42 as necessary to store the data of the File 38. At that time, the Storage Manager 36 will provide to the File Manager 40 an identification of the first Allocation Unit 42 allocated to store data of that file and, as described above, the chain of Allocation Units 42 may then be followed from Allocation Unit 42 to Allocation Unit 42 to access the data of that file. It should be noted that if data is subsequently added to the file, the Storage Manager 36 may subsequently follow the chain of Allocation Units 42 of the file to find the last Allocation Unit 42 of the file. The Storage Manager 36, after searching for unallocated Allocation Units 42, may then allocate as many additional Allocation Units 42 as necessary to contain the added data, extending the string of Allocation Units 42 as necessary. It should be noted that in the Microsoft DOS operating system, the start of the cluster chain is stored at Microsoft defined locations in the relevant directory clusters in the same MSU 20.

It will be understood that the above discussion of files and file managers is solely intended for illustrative purposes and to provide background information regarding mechanisms and contexts that will be referred to in the following descriptions of the present invention. It will also be understood that while certain implementations and embodiments of the present invention include a new and improved file structure that is described and claimed herein, the data compression methods and apparatus of the present invention are not dependent upon or limited by the specific mechanisms used for the creation and maintenance of files or directories. It will also be understood that the structure, operation, functions and embodiments and implementations of the data compression methods and apparatus of the present invention are independent of the specific contents or form of contents of the Allocation Units 42S or 42R. As will be described in detail in the following, the data compression methods and apparatus of the present invention are directed to the elimination of duplicates of various Allocation Units 42 based on the contents of Allocation Units 42 independently of the interpretation of the meaning of the contents of Allocation Unit 42.

Figure 3:
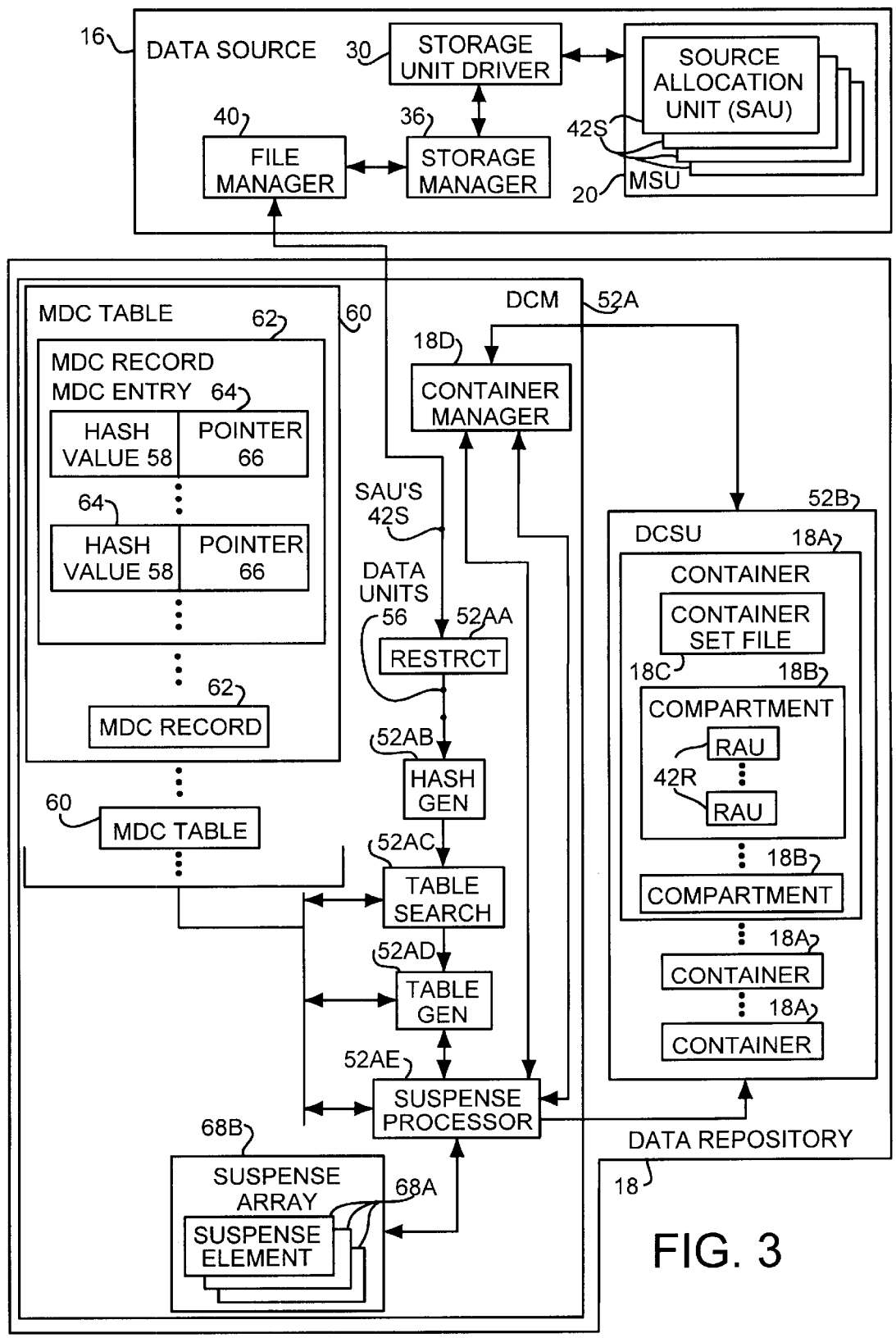
FIG. 3 is a block diagram of a system incorporating the present invention.
Figure 4:
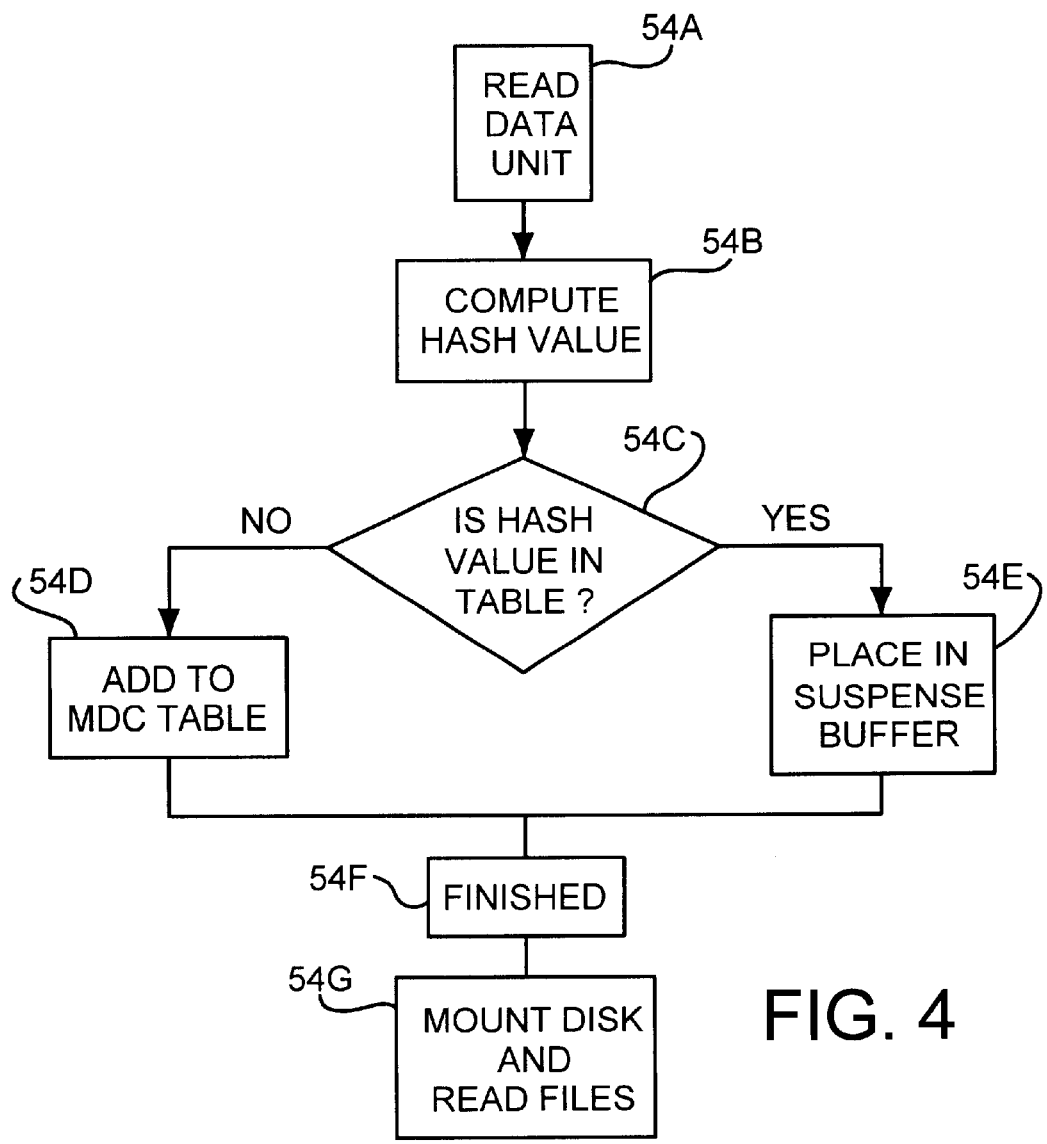
FIG. 4 is a flow diagram illustrating the operation of the present invention.

3. General Description of the Invention (FIGS. 3 and 4)

As will be described below, the present invention introduces a fourth data compression method mechanism that is distinguished from the three methods of the prior art discussed above by being an inter-disk and intra-disk method based on the contents of physical and/or logical disk drives. In addition, and as will be described, the method of the present invention does not distinguish between files and non-file data, such as "directory information" and, in fact, is independent of how the data is organized on the disk.

As described above and will be described in the following, the present invention provides a mechanism in which any and all Allocation Units of MSU 20 can be copied or stored in such a manner that Allocation Units 42 that have identical contents are eliminated in the representation of MSU 20 in a Data Repository 18 stored on User System 12R and a mechanism whereby data, such as Data 22 or Programs 24, may be copied or read from a Data Source 16, such as the MSU 20 of a User System 12S, and stored in optionally compressed form in a Data Repository 18.

It should be noted that the implementation of the preferred embodiment of this invention understands the internal structure of the MSDOS files system, that is, the internal representation of FATs, directory structure, and at the lowest level, files, so that the preferred embodiment can determine if certain Allocation Units 42, that is, clusters, are currently "in use" and need to be copied should the user of the present invention wish to copy the contents of the entire MSU 20. In the preferred embodiment, the user has a choice as to whether to copy all Allocation Units 42 or just the Allocation Units 42 that the operating system, such as MSDOS, considers to be in use.

Referring to FIGS. 3 and 4, therein are respectively shown a diagramatic representation of Data Repository 18 and a flow diagram of the operation of the present invention as embodied in a Data Compression Mechanism (DCM) 52A and a Data Compression Storage Unit (DCSU) 52B. In the presently preferred embodiment, DCM 52A is implemented in a program residing and executing in User System 12R and using the facilities of User System 12R, that is, the system processor, memory, mass storage devices, and operating system, including the Storage Manager 36 and File Manager 40 to read data, e.g., clusters, data files, or programs, from a Data Source 16 and to store the data in compressed form in a Data Repository 18. DCSU 52B, in turn, is implemented in a mass storage device, typically a disk drive, that may be the MSU 20 of User System 12R or an additional mass storage device connected to the User System 12R and dedicated to this purpose. It will be understood that other forms of mass storage device may be used for DCSU 52B, such as a system or network disk drive array, or a tape drive or optical disk drive of a software emulator of a hard disk drive. It will also be understood that the method of the present invention may be implemented in a System 10 comprised of a single User System 10 whereupon the single User System 12 contains both the Data Source 16 and the Data Repository 18. It will be further understood that the present invention may be implemented in a System 10 comprised of multiple User Systems 12, whereupon the Data Repository 18 will reside in a selected or assigned one of the User Systems 12 while the Data Source 16 may be comprised of one or more User Systems 12 whose files are accessible to the User System 12 in which the Data Repository 18 resides, including the User System 12 containing the Data Repository 18.

Lastly, it has been described above that DCM 52A may use the underlying operating system of the User System 12 to implement DCM 52A and DCSU 52B, including using the Storage Manager 36 and File Manager 40 to organize, manage and display the Repository Allocation Units (RAUs) 42R of Data Repository 18 and files containing MDC Table 60 with MDC Records 62 and Record Entries 64. As is well known and understood, however, the File Allocation Table of operating systems such as Microsoft DOS and Microsoft Windows impose limitations on the size of files that may be handled in by the file management facilities of the operating systems. For example, a FAT 16 file system imposes a limit of 2 gigabytes on files and the FAT 32 file system imposes a limit of 4 gigabytes on the size of any particular file.

For this reason, and although DCM 52A may use the file management facilities of the operating system of the system in which the present invention is implemented, some embodiments of the invention provide an alternate mechanism for storing and managing Repository Allocation Units (RAUs) 42R of Data Repository 18 and files containing MDC Table 60 with MDC Records 62 and Record Entries 64 that uses indirection to extend the sizes of files that can be stored and managed. Referring to FIG. 3, it is illustrated therein that in this embodiment at least part of the storage space the system on which the invention is implemented, and in particular DCSU 52A, is organized into one or more Containers 18a and each Container 18a is organized into one or more Compartments 18b. A Container 18a is thereby a collection of one or more Compartments 18b, and each Compartment 18b is a file comprised of one or more Repository Allocation Units 12R that DCM 52A uses to store all or part of, for example, the Data Units 56 of a Data Source 16. As indicated, associated with each Container 18a is a Compartment Set File 18c that lists a set of one or more files, that is, Compartments 18b, that are to be treated and managed, logically, as a single file. Each Container 18a is treated as a single file but, through Compartment Set File 18c, incorporates all Compartments 18b that are listed in the Compartment Set File 18c, so that all of the Compartments 18b listed in a Compartment Set File 18c are treated as a single file as an entity, that is, as the Container 18a. The file mechanism further includes a Compartment Manager 18d that functions in a manner generally analogous to the Storage Manager 36 and File Manager 40 of a conventional system to create, allocate and construct Containers 18a, Compartments 18b and Compartment Set Files 18c, to allocate Repository Allocation Units 12R to Compartments 18b, and to write and read data to and from Repository Allocation Units 12R. Container Manger 18d also interfaces with the system native file management facilities, such as Storage Manager 36 and File Manager 40, to translate between native system read and write operations and Container 18a and Compartment 18b read and write operations.

In summary, this structure thereby uses indirection to incorporate a plurality of files, that is, Compartments 18b, into a single file, a Container 18a, that appears to the file management facilities as a single file. As a result, this structure removes the conventional FAT type limitation on file sizes, although each Container Set File 18c can be limited as regards the size of the Container 18a or the sizes of the Compartments 18b therein.

It is also anticipated that the number of files, that is, Compartments 18b, listed in Compartment Set File 18c will automatically grow as the need for more files is encountered as data is added to the Container 18c. It is further anticipated that the files, that is, Compartments 18b, listed in the Compartment Set File 18c may be spread over a multitude of User Systems 12R. As Compartment 18b file names are appended to a Compartment Set File 18c, these names may be automatically generated by taking into consideration the names of other Compartment 18b file names in the Compartment Set File 18c.

It will be understood for the purposes of the following descriptions that DCSU 52B is implemented using Containers 18a comprised of Compartments 18b which in turn are listed in Compartment Set File 18c, and a Compartment Manager 18d as described above. The modifications to the above description of the present invention relating to FIG. 4 to accommodate the use of either Containers 18a or conventional file mechanism will be apparent to those of ordinary skill in the arts after the above discussions and the following detailed descriptions of the present invention. It also will be understood that the Container 18a and Compartment 18b file structure may be used for purposes other than the storing of Data Units 56, such as storing the tables and records, described below, used by the present invention to perform and manage the data storage operations performed by the present invention.

As illustrated in FIGS. 3 and 4, the basic data compression method performed by a DCM 52A of the present invention comprises the following steps, certain of which will be discussed in further detail with respect to subsequent figures:

Step 54a: Restructure Mechanism (RESTRUCT) 52AA reads data from a Data Source 16 in Source Allocation Units (SAUs) 42S of the Data Source 16 and, if necessary, restructures the data into Data Units 56, each having a size corresponding to the size of Repository Allocation Units (RAUs) 42R of the Data Repository 18. The Source Allocation Units (SAUs) 42S do not need to be restructured if the geometry, that is, cluster size, sector size, number of clusters, and so forth, of Data Source 16 is identical to that of the disk being simulated by Data Repository 18.

Step 54b: Hash Value Generator (HashGen) 52AB computes a Hash Value 58 for the data of each Data Unit 56 generated from the data read from the Data Source 16.

Step 54c: As described next below, Step 54c is a database search for a key which, in this case, is a Hash Value 58. As will be apparent to those of ordinary skill in the relevant arts, a number of database structures may be used to implement the database structures and operations described in the following. Because classic database engines and techniques do not provide the desired performance desired, however, the presently preferred embodiment of the present invention incorporates a search engine and database structure, identified herein as Manifold Data Compression (MDC) Table 62, that is implemented to meet the desired performance goals of the present invention.

According to the presently preferred embodiment, therefore, in Step 54c, and for each new Data Unit 56, a Table Search Mechanism (Table Search) 52AC searches a for a Manifold Data Compression Record (MDC) Record 62 having a Record Entry 64 that corresponds to a possibly already existing Repository Allocation Unit (RAU) 42R in DCSU 52B and that has a Hash Value 58 matching the Hash Value 58 of the Data Unit 56. In the presently preferred embodiment, and as represented in FIG. 3, an MDC Table 60 is organized into a linked chain of MDC Records 62 wherein each MDC Record 62 contains a block of "n" Record Entries 64 wherein "n" may, for example, be 2048. Each Record Entry 64 contains the Hash Value 58 of the data of an Data Unit 56 stored in a Repository Allocation Unit (RAU) 42R and a Pointer 66 to a corresponding Repository Allocation Unit (RAU) 42R in Data Repository 18. It will be understood that the Repository Allocation Unit (RAU) 42R residing in Data Repository 18 may be in compressed form, using standard block compression techniques.

Step 54d: When the Hash Value 58 of an Data Unit 56 does not match a Hash Value 58 residing in an MDC Table 60, a duplicate of the data in the Data Unit 56 does not already reside in the Data Repository 18. Container Manager 18d writes the data of the Data Unit 56 into a newly allocated Repository Allocation Unit (RAU) 42R of the DCSU 52B and a Table Generator (Table Gen) 52AD writes a new Record Entry 64 into MDC Table 60 wherein the Record Entry 64 contains the Hash Value 58 of the data of the Data Unit 56 and Pointer 66 to the corresponding Repository Allocation Unit (RAU) 42R. In the presently preferred embodiment, each Pointer 66 may be of the form of a byte offset of the start of the Repository Allocation Unit (RAU) 42R from the start of DCSU 52B. In addition, and as discussed, the data of the Data Unit 56 may be written into the newly allocated Repository Allocation Unit (RAU) 42R in compressed form using standard block compression techniques.

Step 54e: When the Hash Value 58 of a Data Unit 56 matches a Hash Value 58 residing in an MDC Table 60, a duplicate of the data in the Data Unit 56 may already reside in the Data Repository 18. That is, it is possible for the Repository Allocation Unit (RAU) 42R to have the same Hash Value 58 and yet have different contents. This situation is referred to as a hash value collision and this collision must be dealt with. The traditional method of dealing with such a collision is to immediately go back and read the corresponding Repository Allocation Unit (RAU) 42R from the DCSU 52B to compare the Repository Allocation Unit (RAU) 42R with the Data Unit 56. This method, however, results in an unacceptable performance degradation. Thus, in the preferred embodiment, the handling of Hash Value 58 collisions is optimized as described below.

In the method for handling Hash Value 58 collisions in the presently preferred embodiment of the invention, which will be described in detail in a following description, a Suspense Processor 52AE writes the data of the Data Unit 56 and, for example, its Hash Value 58, into a Suspense Element 68a of a Suspense Array 68b for subsequent processing. In the subsequent processing of Hash Value 58 collisions, a Suspense Processor 52AE and Table Search 52AC use the Hash Value 58 of the Data Unit 56 to access an MDC Table 60 to locate the Repository Allocation Unit (RAU) 42R containing a previously existing possible match to the data of a suspended Data Unit 56 represented in a Suspense Element 68a. Suspense Processor 52AE compares the data of the suspended Data Unit 56 with the data read from the Resource Allocation Unit 42R by Container Manager 18d. If the data of the suspended Data Unit 56 is found not to match the data of the Resource Allocation Unit 42R, the data of the suspended Data Unit 56 is written into a newly allocated Repository Allocation Unit (RAU) 42R of DCSU 52B, the data being written into the Resource Allocation Unit 42R possibly being compressed using standard block compression techniques, and a new Record Entry 64 containing the Hash Value 58 of the data of the Data Unit 56 and Pointer 66 to the corresponding Repository Allocation Unit (RAU) 42R is created in MDC Table 60, as described above. If the data of the of the suspended Data Unit 56 is found to match the data read from the Resource Allocation Unit 42R, the suspended Data Unit 56 is discarded as being a duplicate of data already existing in a Repository Allocation Unit (RAU) 42R.

Step 54f: The process is completed when all data from Data Source 16 has been processed as described with respect to Steps 54a to 54e.

It will be recognized and understood from the above description of the present invention that the compression method of the present invention operates in both an intraallocation unit manner and in an inter-allocation unit manner. That is, the compression method of the present invention searches across Repository Allocation Units (RAU) 42S to identify allocation units containing identical data and replaces each instance of multiple copies of a given allocation unit from the source data with a single copy of that allocation unit with the redundant instances of the allocation unit being replaced with pointers to the single copy of the allocation unit. The method of the present invention is therefore in fundamental contrast to the data compression methods of the prior art, such as that described in U.S. Pat. No. 5,778,395 wherein the search for duplicated data is based on the file structure of the data source and the compression method attempts to replicate the file structure of the data source in compressed form, that is, by eliminating files or portions of files having duplicate contents. In contrast, the compression method of the present invention operates on the basis of the storage allocation units of the data source, that is, the physical organization of the data in the data source, such as clusters or disk sectors, and essentially replicates the storage allocation unit structure of the data source in compressed form by eliminating source storage allocation units having duplicate contents. As will be described further below, the method therefore offers significant advantages over the methods of the prior art.

It will also be noted that the initial conversion of the data to be compressed from the Allocation Units 42 of the Data Source 16 to Resource Allocation Units 42r does not result in either a loss of data or subsequent difficulties in locating and restoring data from the Data Repository 18. As will be described further in a following discussion, the data from the Data Source 16 may be processed a file at a time or, alternatively, an entire (disk) volume may be copied, which ignores the internal file-oriented structure, and stored in an analogous organization in Data Repository 18. That is, the MDC Record 62 and the Record Entries 64 may be constructed and organized according to the file and directory, chapter, archive or other organization of Source Data 16. For example, if the Source Data 16 were organized by directories, sub-directories and files, the MDC Table 60, MDC Records 62, and the Record Entries 64 contained therein represent similar data, but with the Files 38 represented in a many-to-many mapping by sequences of Record Entries 64 wherein a Record Entry 64 represents Data Unit 56 appearing in one or more Files 38. In this regard, it should be noted that, as described, it is possible for Record Entry 64 to represent data from both a File 38 as well as non-file data in Data Repository 18. It should be noted in this respect that, in the preferred embodiment, the MDC Table 60 is used only for determining if two or more RAUs 42R contain the same data. The actual restoration of data from the DCSU does not depend on the MDC Table 60 since the pointer to the underlying data has already been stored in the appropriate data structure.

It should also be noted that if the geometry of DCSU 52B is identical to the geometry of Data Source 16, that is, if the size of Repository Allocation Units (RAUs) 12R is equal to the size of the allocation units in Data Source 16, the number of Allocation Units is identical, and so on, a so-called "sector by sector" backup of the MSU 20 associated with Data Source 16 is possible and an exact duplicate of the MSU 20 associated with Data Source 16 is possible. Further, the MSU 20 associated with Data Source 16 can be completely scrambled, thus eliminating any useful concept of file and/or directory, and the methods of the present invention can still completely and perfectly restore the MSU 20 associated with Data Source 16 and still, possibly, achieve high degrees of compression.

Lastly in this respect, it will be recognized that a user will desire to read, recover or restore the compressed data from Repository Allocation Units (RAUs) 42R of DCSU 52B, for example, to use the data directly, to restore the contents of a data source or to create another data source containing the same data as the original data source. This process of reading, recovering or restoring data from Repository Allocation Units (RAUs) 42R of DCSU 52B may be regarded as an additional, final step of the process illustrated in FIG. 4 and is represented therein as Step 54(g).

In this regard, it will be appreciated and understood by those of ordinary skill in the relevant arts that there are two general ways for users to access collections of files, such as files in a Zip file or files in a Container 18a of Data Repository 18. The first and frequently easier way is for a programmer to write a custom application program that allows the user to access the collection.

The second method, and the method used in a presently preferred embodiment of the present invention, provides significantly greater flexibility in accessing the data. In this method, and once the user has selected the container, and perhaps a chapter within the container, the collection of files represented by the simulated disk so selected is "mounted" as a disk volume by a file system driver. In this regard, it must be noted that the methods of the prior art, such as previously described with respect to U.S. Pat. No. 5,778, 395, operate on the basis of the file structure of the original data source rather than, as in the present invention, on the basis of the contents of the Source Allocation Units (SAUs) 42S of the data source. It must also be understood that, as previously described, certain clusters may not and probably will not be allocated to files as these clusters are allocated by a File Manager 40 for the File Manager 40's own use for certain "housekeeping" purposes, such as the maintenance of directories for locating files or for the allocation of space for the allocation tables themselves. Because of this, and because the compression methods of the prior art operate on the basis of the source file structure rather than on the basis of disk clusters or sectors, the compression methods of the prior art required that the on-disk format of the data source be synthesized or imitated in some manner because the exact on-disk format of the data source is lost. The method of the present invention, however, which operates on the basis of Source Allocation Units (SAUs) 42S, such as clusters or sectors, retains the on-disk format of the data source, so that this information generally already exists in the repository data. As a result, and with use of the method of the present invention, a file system driver of the type generally referred to as a "block device driver" that is similar to those used in systems of the prior art, such as TAPEDISK, may be used or written for these purposes. Such device drivers are well known to those of ordinary skill in the relevant arts and knowledgeable of the prior art and those of ordinary skill in the relevant arts will appreciate that the use of such block device drivers offer many advantages compared to the compression methods of the prior art, such as the methods described in U.S. Pat. No. 5,778,395. For example, wellknown system tools, for example Norton Disk Doctor or Norton Disk Edit, could be used to repair a defective on-disk structure. In an alternative implementation, a driver of the type referred to by those or ordinary skill in the relevant arts as an installable file system (IFS) driver can be written, wherein such drivers abstract the on-disk data into a collection of files.

The block device driver provides all the operating system functions necessary to allow any application to access the on-disk data and/or files. For example, if a user wishes to view a spreadsheet file that exists in a chapter of a container then, once this chapter in this container is mounted, the user may simply run the spreadsheet program and open the file directly on the mounted volume, without having to copy the file to a locally accessible volume. Alternatively, the user may simply copy any files from the mounted volume to a local hard disk using any suitable file management application. This method thereby allows the user to access the data in a container in a more intuitive way, using the tools and applications already available and familiar to a user instead of a dedicated restore application that is unfamiliar because it is rarely used.

It must be further noted that the data compression method of the present invention avoids the previously discussed "counting problem" in using hash values to represent a body of data in two ways. First, as described above the data compression method of the present invention operates on one data unit at a time wherein each data unit is the size of an allocation unit of the Data Repository 18. If, for example, DCSU 52B and DCM 52A are implemented on a Microsoft DOS system, the allocation units are clusters typically having a size of 512 bytes, 1024 bytes, 2048 bytes, . . . , 32K bytes or 64 Kbytes.

If one assumes the existence of a 5 gigabyte FAT32 file system in which there are 4K cluster then there will be approximately 1.25 million clusters. The present implementation of DCM 52A uses a CRC32 algoritlun which, by definition, generates 32 bit hash values. In general and on average, if the number of bits in a hash is 32 bits and the hash values are uniformly distributed across the possible input values then one would expect a hash value collision once every $2^{16}$ (65,536) hash key value generations. That is, if the hash is n bits long then a collision is expected once every $2^{n/2}$ occurrences. In the case of the above, mentioned five gigabyte FAT32 file system, one would expect approximately twenty collisions. As such, the hashing algorithm and size of hash values are selected, for any given implementation, so that the number of bits used in the hash values relative to the number of allocation units is such that the likelihood that nonidentical data units will result in identical hash values is significantly reduced, so that such occurrences will be relatively rare.

In addition, and as described above, the method of the present invention compares the actual data of the new data unit with the actual data of the previously stored data unit when a data unit having the same hash value as a previously stored data unit is detected. As such, the possibility of an erroneous identification of a data unit as being identical with a data unit actually containing different data, even by one bit, is eliminated. In this regard, and as will be discussed further below, the method of the present invention includes a method for handling hash values for two non-identical data units that have resulted in identical hash values, that is, handling hash value collisions, thereby allowing the two non-identical data units to be individually and uniquely identified and represented in the MDC Record 62 and in the Data Repository 18 and to do so in a non-obvious manner.

The methods of the present invention thereby avoid the counting problem for two reasons. First, the methods of the present invention explicitly track and deal with the inevitable collisions of the H(N), so that bodies of data having the same hash value but different contents are recognized and treated as non-identical bodies of data. Second, the methods of the present invention recognizes that there are many repetitions and redundancies in the bit steam of M bits in much of the data in many computer systems. As such, in most systems there are fewer than the theoretical maximum number of actually unique bodies of data and the counting "problem" is less severe in practice than in theory.

It must also be noted that the compression method of the present invention may additionally compress the Repository Allocation Units (RAU) 42R by using standard block compression methods, thus achieving additional benefit. It will be appreciated that this method will therefore provide significant data compression ratios in instances, for example, wherein System 10 contains multiple copies of an application program or a data file, which is a common occurrence in multi-user or multi-processor systems. This is also a common occurrence in "chapterized" systems wherein identical copies of a program or data file often appear in successive "chapters", and will result in comparable data compression ratios.

The advantages of the compression method of the present invention over those of the prior art when used in conjunction with, for example, a standard block compression method may be illustrated by an example. Assume that three files may be respectively identified by different file names as File1, File2 and File3, that the three files may each be of a size of 100,000,000 bytes and that the data in the files may differ from one another by a single byte. When compressed by conventional methods, File1, File2 and File3 may each be individually compressed approximately 50%, depending on their internal redundancies, resulting in three files, each having a size of approximately 50,000,000 bytes, so that the total size of the three files after conventional compression would be approximately 150,000,000 bytes. Using the method of the present invention, and assuming that the files are operated upon in the order File1, File2, File3, File1 will first be compressed to an extent dependent upon the redundancy among the allocation units in File1 alone, resulting in File1 being compressed approximately 50%, to a size of about 50,000,000 bytes, giving results for File1 that are similar to those of the prior art methods for intra-file compression.

Lastly, it will be noted that the method of the present invention has been described above and will be described further in the following with the assumption that neither the source data nor the compressed data stored in the Data Repository 18 is encrypted. It will be apparent to those of ordinary skill in the relevant arts, however, that the compression method of the present invention is independent of the type, form or format of source data in a Source Allocation Unit (SAU) 42S, that is, the method of the present invention compares the data of Source Allocation Units (SAUs) 42S with the data of other Source Allocation Units (SAUs) 42S to identify Source Allocation Units (SAUs) 42S having duplicate contents regardless of the specific form of that data. It will also be apparent to those of ordinary skill in the relevant arts that Repository Allocation Units (RAU) 42R may be encrypted using any preferred encryption method, in the same manner that Repository Allocation Units (RAUs) 42R may be additionally compressed using standard block compression methods. As in the instance wherein Repository Allocation Units (RAUs) 42R are additionally compressed using block compression methods, and thus will be decompressed when read for any purpose, such as for comparison with suspended data units or when a user desires to read the data, encrypted Repository Allocation Units (RAUs) 42R will be decrypted when read.

4. Detailed Descriptions of the Invention (FIGS. 3, 4, 5, 6, 7, 8, 9, 10 and 11)

Having described the overall structure and operation of the present invention and a system embodying the present invention, the following will describe in further detail certain aspects of the system and method of the present invention that have been described above. It will be noted that the components of DCM 52A that execute each of the processes have been indicated and discussed with reference to FIGS. 3 and 4 and that reference will be made to FIGS. 3 and 4 and the above descriptions of the operation of DCM 52A during the following detailed descriptions of each of the operations or steps shown in FIG. 4.

1. Step 54c (FIGS. 3, 4 and 5)

Figure 5:
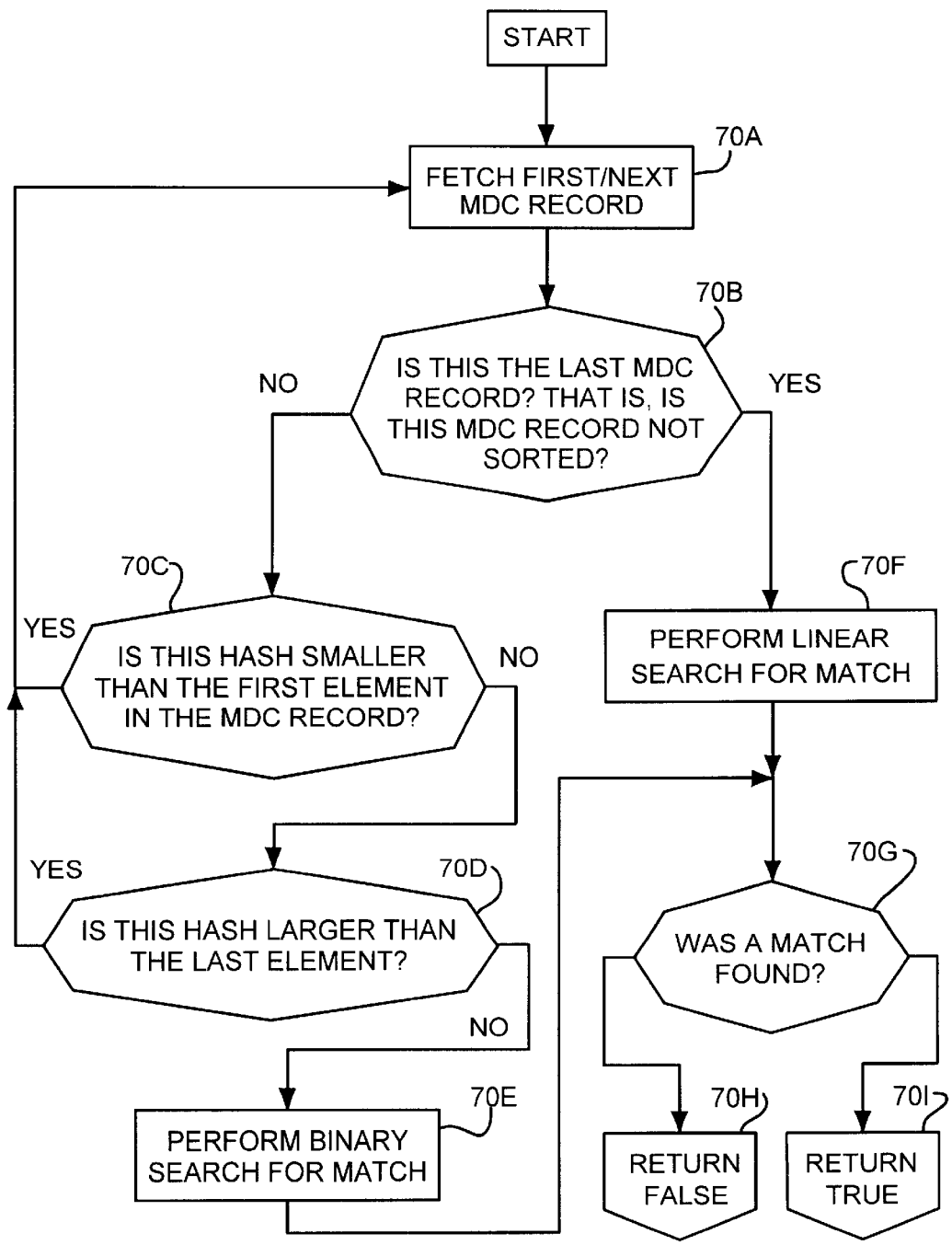
FIG. 5 is a flow diagram illustrating a search of a data compression table of the present invention.

Referring to FIG. 5, therein is shown a flow diagram of the operation of step 54c of the data compression method of the present invention as embodied in a DCM 52A (FIG. 3). As described above, each Record Entry 64 is keyed by the Hash Value 58 of the data of an Data Unit 56 stored in a Repository Allocation Unit (RAU) 42R and includes a Pointer 66 to the corresponding Repository Allocation Unit (RAU) 42R in a Container 18a of Data Repository 18. In Steps 54a and 54b (FIG. 4), the system receives a new Data Unit 56 from the Data Source 16 and computes a Hash Value 58 for the data of the newly received Data Unit 56. In Step 54c, the system determines whether the MDC Table 60 already contains the newly received Data Unit 56 by searching the MDC Table 60, that is, and in the presently preferred embodiment, all the MDC Records 62, for a Record Entry 64 corresponding to an already existing Repository Allocation Unit (RAU) 42R having a Hash Value 58 matching the Hash Value 58 of the newly received Data Unit 56.

The MDC Table 60 is, in the presently preferred embodiment, a RAM-based table. Therefore, a statement in the following that an MDC Record 62 is fetched means that the MDC Record 62 is accessed via a pointer from the previous MDC Record 62 since these records are chained together using conventional pointers. It should be obvious to anyone of ordinary skill in the arts that, should RAM become a precious resource because there are too many MDC Records 62, moving some or all of the MDC Records 62 to, for example, disk is well within the anticipated art.

It should also be noted that the following "boundary condition" can occur because, in the presently preferred embodiment, the number of MDC Records 62 is limited. If an incoming Data Unit 56 has a Hash Value 58 which cannot be found anywhere in MDC Table 60 and the system cannot allocate another MDC Record 62 because of the limit that the user has set on the number of MDC Records 62, then the incoming Data Unit 56 is stored, possibly in compressed format, in a Resource Allocation Unit 12R of Data Repository 18. No duplication elimination is or will be performed on this Allocation Unit because of a lack of system resources, that is, because there are no more MDC Records 62 that the system is able to allocate. As will be apparent to those of ordinary skill in the arts, no Suspense Array operations, as described below, will be performed on this newly received Data Unit 56.

In the following description of the method, the above mentioned boundary condition is ignored in order to highlight the normal operation of the method.

As illustrated in FIG. 5, upon receiving the Hash Value 58 of a newly received Data Unit 56, DCM 52A:

Step 70a: Fetches the first/next MDC Record 62, which may be the first MDC Record 62 if the search is beginning at the start of the MDC Table 60 or the next sequential MDC Record 62 if the search is not starting at the start of the MDC Table 60.

Step 70b: Determines whether the fetched first/next MDC Record 62 is the last MDC Record 62, that is, determines whether the MDC Record 62 has been sorted according to its Hash Values 58 as, as described below, the last MDC Record 62 is not sorted according to Hash Values 58. If the first/next MDC Record 62 is not the last MDC Record 62 in the MDC Table 60, the system proceeds to Step 70c and, if the first/next MDC Record 62 is the last MDC Record 62 in the MDC Table 60, the system proceeds to Step 70f, described below.

Step 70c: If the first/next MDC Record 62 was not the last MDC Record 62, as determined in Step 70b, the system determines whether the Hash Value 58 of the newly received Data Unit 56 is smaller than the Hash Value 58 of the first (sorted) Record Entry 64 in the MDC Record 62 and, if the result is yes, returns to Step 70a and fetches the next MDC Record 62. If the Hash Value 58 of the newly received Data Unit 56 is not smaller than the Hash Value 58 of the first (sorted) Record Entry 64 of the MDC Record 62, the system proceeds to Step 70d.

Step 70d: The system determines whether the Hash Value 58 of the newly received Data Unit 56 is larger than that of the last Record Entry 64 of the MDC Record 62 and, if the result is yes, returns to Step 70a and fetches the next MDC Record 62 assuming that such a record exists. If the result is no, the system proceeds to Step 70e.

Step 70e: The system performs a binary search of the Hash Value 58 of the newly received Data Unit 56, based on the fact that all Record Entries 64 in the MDC Record 62 are sorted by the Hash Value 58 of each Record Entry 64, to find a possible match between the Hash Value 58 of the newly received Data Unit 56 and the Hash Value 58 of a Record Entry 64 in MDC Records 62, and proceeds to Step 70g.

Step 70f: If, as described in Step 70b, the first/next MDC Record 62 is the last MDC Record 62 in the MDC Table 60, the system performs a linear search to find a match between the Hash Value 58 of the newly received Data Unit 56 and the Hash Value 58 of a Record Entry 64 in the MDC Record 62, and proceeds to Step 70g. In the presently preferred embodiment of the present invention, the system performs a linear search rather than a binary search because it has been observed that, for small numbers of elements, it is faster to do a linear search using tightly coded assembler program than it is to do an insertion sort and a binary search.

Step 70g: The system determines whether a match was found between the Hash Value 58 of the newly received Data Unit 56 and the Hash Value 58 of a Record Entry 64 in the MDC Record 62. If no match was found, then the system proceeds to Step 54d (FIG. 4, Flow Chart 1) and attempts to add a new entry to the MDC Record 62 and store the Data Unit 56, possibly in compressed format, in a Resource Allocation Unit 12R of Data Repository 18 if a match was not found. As has been described above, in a presently preferred embodiment Data Repository 18 is structured into Containers 18a and Compartments 18b and Data Units 56 are stored in the Repository Allocation Units 12R of one or more Compartments 18b of Containers 18a of Data Repository 18, so that entries in MDC Record 62 will point into the Container 18a structures. If a match was found between the Hash Value 58 of the new Data Unit 56 and the Hash Value 58 of a Record Entry 64, DCM 52A proceeds to Step 54e of FIG. 4, placing the Hash Value 58 and data of the newly received Data Unit 56 in Suspense Array 68d.

2. Step 54d (FIGS. 3, 4 and 6)

It has been described above with respect to Step 54d that when the Hash Value 58 of an Data Unit 56 does not match a Hash Value 58 residing in an MDC Table 60, a duplicate of the data in the Data Unit 56 does not already reside in a Container 18a of the Data Repository 18. The data of the Data Unit 56, which may be compressed using standard block oriented compression techniques, is written into a newly allocated Repository Allocation Unit (RAU) 42R in a Container 18a of the Data Repository 18 and a new Record Entry 64 is created and entered into an MDC Record 62, which may be newly created, wherein the Record Entry 64 contains the Hash Value 58 of the data of the Data Unit 56 and Pointer 66 to the corresponding Repository Allocation Unit (RAU) 42R in the Container 18a.

Figure 6:
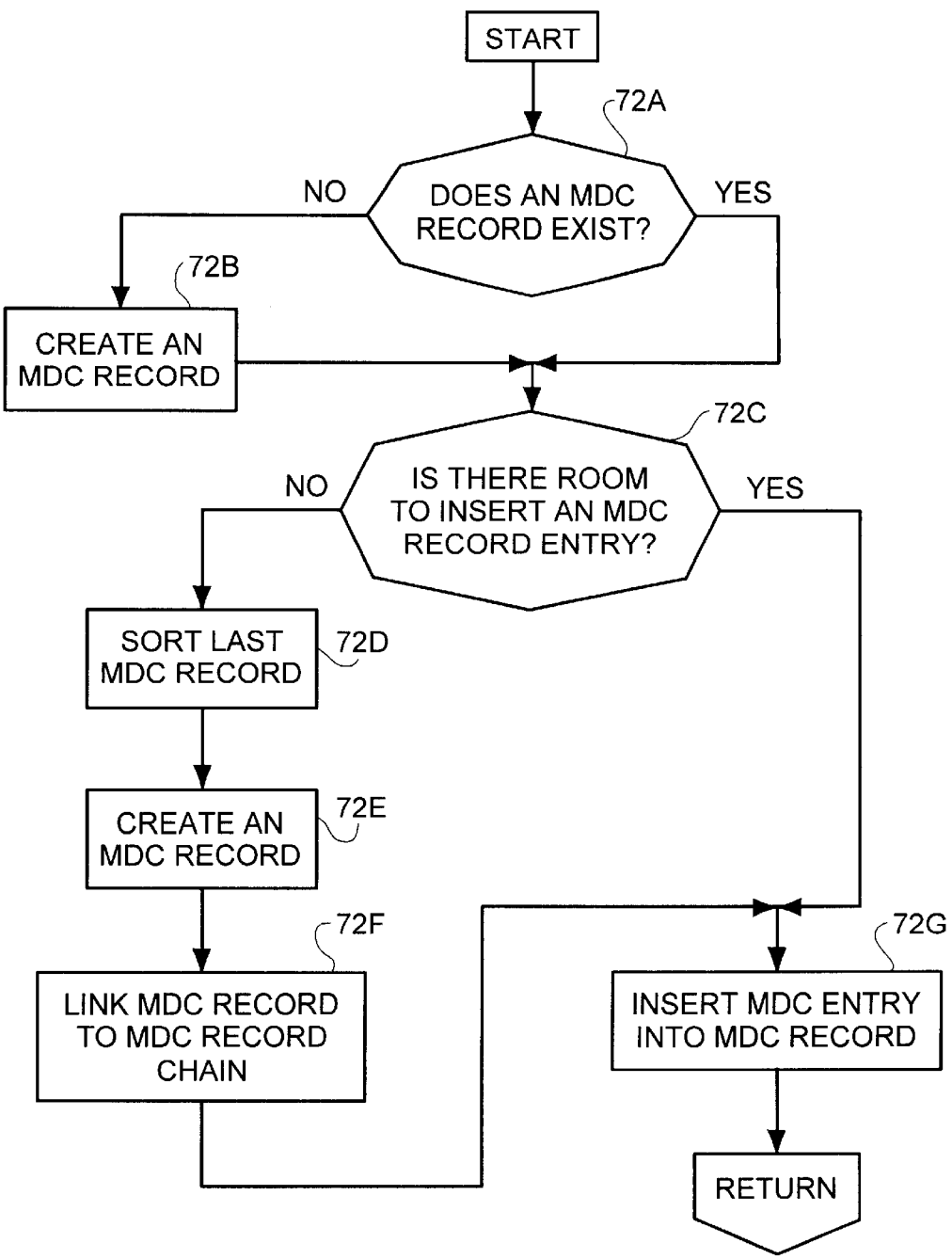
FIG. 6 is a flow diagram illustrating the addition of an entry to a data compression table of the present invention.

FIG. 6 is a flow diagram of the operation of DCM 52A in executing Step 54d, wherein it is shown that Step 54d is comprised of the steps of:

Step 72a: DCM 52A determines whether an MDC Record 62 exists to receive the Record Entry 64 of the newly received Data Unit 56, that is, whether there is a last MDC Record 62 in the chain of MDC Records 62 that is available to receive the new Record Entry 64. In this regard, DCM 52A, for example, may not at this time have created the first MDC Record 62 of the MDC Table 60. If the result is no, the DCM 52A proceeds to Step 72b and, if the result is yes, the DCM 52A proceeds to Step 72c.

Step 72b: DCM 52A creates a new MDC Record 62 to receive the Record Entry 64 of the newly received Data Unit 56, and proceeds to Step 72c.

Step 72c: DCM 52A determines whether the MDC Record 62 has space to receive a new Record Entry 64, that is, whether the MDC Record 62 contains fewer than the maximum number of Record Entries 64 that can be contained in an MDC Record 62. For example, in a present embodiment an MDC Record 62 can contain up to 2048 Record Entries 64. If the result is yes, the system proceeds to Step 72g and, if the result is no, the system proceeds to Step 72d.

Step 72d: DCM 52A sorts the last MDC Record 62 according to the Hash Values 58 therein as the current last MDC Record 62 will no longer be the last MDC Record 62 in the chain of linked MDC Records 62 because of the process in Step 72e.

Step 72e: DCM 52A creates a new MDC Record 62 to be the new last MDC Record 62.

Step 72f: DCM 52A links the newly created MDC Record 62 to the chain of MDC Records 62 to be the new last MDC Record 62 in the chain, and proceeds to Step 72g.

Step 72g: DCM 52A inserts the new Record Entry 64 into the last MDC Record 62 of the chain of MDC Records 62, and returns to Step 54d as illustrated in FIG. 4. As described, this last MDC Record 62 may be an already existing MDC Record 62 or a newly created MDC Record 62.

Before continuing with the discussion of the operation of DCM 52A, it should be noted that the operations of searching the MDC Records 62 of MDC Table 60 and of inserting a new Record Entry 64 may significantly affect the performance of a DCM 52A. For example, as it is not unusual for a FAT 32 logical drive of the type common to present computer systems to have on the order of a million clusters, and the MDC Records 52 of a MDC Table 60 may contain a comparable number of Record Entries 64.

A linear search through a large MDC Table 60, having perhaps on the order of a million entries, will require a correspondingly large number of processor cycles and will accordingly be slow. Recoding the search routines into computer specific assembly code will improve performance, but not radically. Similarly, an insertion sort into the table, instead of a liner search, may be twice as fast as a linear search, which does not provide a significant improvement and could be slower because of requiring memory write operations as memory writes tend to invalidate CPU caches and are thus slower than memory read operations.

For these reasons, the presently preferred embodiment of DCM 52A uses a combination of a linear search, binary search, and a sort. Specifically, MDC Table 60 is organized into blocks, that is, MDC Records 62, containing up to "n" Hash Values 58 wherein, in the present embodiment, n is 2048, so that each MDC Record 62 contains up to 2048 Record Entries 64. Each MDC Record 62 is allocated dynamically as new MDC Records 62 are needed, limited by user-specified system limits, and the MDC Records 62 are linked into a chain so that a search for a particular Hash Value 58 can be made across MDC Records 62. In an extension of this method, the number of Hash Values 64 in MDC Records 62 may be made tunable, that is, selectable, to provide optimum performance in any particular situation.

In the presently preferred embodiment, an additional optimization is made. Occasionally, a collection of MDC Records 62, referred to as a "puddle", is sorted and, by merging/sorting MDC Records 62, the number of binary searches within MDC Records 62 is thereby reduced. In the present embodiment, the puddle size, that is, number of MDC Records 62, is tunable with a default value of 16. In this regard, it should be noted that having a puddle size that is too small increases the time needed to do binary searches within MDC Records 62 but reduces the time necessary to sort the puddle, while making the puddle size too large will have the same effect as making the puddle size too small because a puddle would never be created.

Considering the Record Entry 64 insertion process described above, when a nonmatch to a Hash Value 58 is found, the last allocated MDC Record 62 is examined to find whether there is room to insert that Hash Value 58. If there is room, the Hash Value 58 of the Data Unit 56 and its corresponding cluster position, that is, the Hash Value 58 of the data of an Data Unit 56 and the corresponding Pointer 66 to the Repository Allocation Unit (RAU) 42R, are inserted into a Record Entry 64 in the MDC Record 62 and the insertion operation for the Data Unit 56 is completed.

If there is no room in the MDC Record 62 for the new Hash Value 58, MDC 52 first sorts the Record Entries 64 of the current MDC Record 62, that is, cluster position Pointers 66 are sorted in sequence of their corresponding Hash Values 58, and MDC 52A adds the now sorted current MDC Record 62 to the end of the chain of MDC Records 52. In the presently preferred embodiment, DCM 52A uses a heap sort algorithm for this process, but there is a large number of algorithms, which will be familiar to those of ordinary skill in the arts, that may be used for this process. DCM 52A then allocates a new MDC Record 62 to be a new last MDC Record 62 of the chain of MDC Records 62, and the Record Entry 64 containing the Hash Value 58 and Pointer 66 of the Data Unit 56 is inserted into the first position in an array of elements of type Record Entry 64 of the new last MDC Record 62.

The search processes described above with respect to FIGS. 5 and 6 then use the fact that the Hash Values 58 and cluster position Pointers 66 of MDC Records 62 are, except for the last MDC Record 62, sorted by Hash Values 58 to facilitate the search processes. In particular, and for the great majority of searches of the MDC Records 62 of an MDC Table 60, such as when determining whether the Hash Value 58 of a new Data Unit 56 matches a Hash Value 58 already in the MDC Table 60, DCM 52A may perform the search by means of a collection of binary searches, one for each MDC Record 62, with a corresponding significant improvement in search time.

3. Step 54e (FIGS. 3, 4 and 7, 8, 9, 10 and 11)

As will be described in the following, the method for handling Hash Value 58 collisions implemented in Step 54e provides an optimization of the processing of duplicated Hash Values 58. It will be noted that this method provides an optimization in time rather than in disk space.

One of the objectives of the present invention is to rapidly identify those allocation units, that is, clusters that already exist in Data Repository 18 to eliminate duplication of stored allocation units. Thus, once it is discovered that a Hash Value 58 of an incoming Data Unit 56 is duplicated, from the search of MDC Table 60, it is incumbent upon DCM 52A to determine if the incoming Data Unit 56 is in fact a duplicate of data already existing in Data Repository 18.

It has been found that the obvious solution to determining if an incoming Data Unit 56 matches a Data Unit 56 already residing in Data Repository, by simply seeking the location of the possibly matching data in a Repository Allocation Unit (RAU) 42R in a Container 18a, is very time consuming. That is, it is very time consuming to issue a multitude of operations, each being comprised of a random seek followed by read of the number of bytes in a Repository Allocation Unit (RAUs) 42R.

Instead, it has been found that a single seek and read operation that encompasses two or more locations located relatively near to one another in a Container 18A is much faster than separate seek and read operations for each location, even if large amounts of unnecessary data are read in the single seek and read operation. As such, in the presently preferred embodiment of step 54e the system is implemented to read Repository Allocation Unit (RAUs) 42R whose contents possibly match Data Units 56 having colliding Hash Values 58 by one or more operations, each comprising a single seek followed and a read of a large buffer. In the presently preferred embodiment, therefore, the system resolves collisions between Hash Values 58 by collecting as many Suspense Elements 68da as will fit into a Suspense Array 68d and processing those Suspense Elements 68da in a single operation in the anticipation that the possibly matching data residing in DCSU 52B will occupy locations near enough to one another to allow a single read to read many Repository Allocation Units (RAUs) 42R that need to be validated for duplicates. This method has been empirically found to provide significant speed increases over the more obvious methods of single reads and compares.

According to the presently preferred embodiment, therefore, Suspense Elements 68a representing Data Units 56 having Hash Values 58 that collide with the Hash Value 58 of a Repository Allocation Units (RAUs) 42R residing in DCSU 52B are written into Suspense Array 68b. When Suspense Array 68b is filled, or at any other time when the Suspense Array 68b must be processed due to other external events, the Suspense Array 68b is sorted by a Suspense Element 68a field, described below, representing the location of the corresponding Repository Allocation Units (RAUs) 42R in DCSU 52B. As many Repository Allocation Units (RAUs) 42R corresponding to the now sorted Suspense Array 68b as is possible are read into a Flushing Buffer 68c. In the presently preferred embodiment, Flushing Buffer 68c is implemented as a large RAM buffer, but it will be understood by those of ordinary skill in the arts that a Flushing buffer 68c may be implemented in other ways. It will also be understood that the number of Repository Allocation Units (RAUs) 42R that may be read into Flushing Buffer 68c in each read operation is dependent upon the capacity of the large RAM buffer used as Flushing Buffer 68c and such factors as the sizes of the Repository Allocation Units (RAUs) 42R as well as how close together, logically and physically, the "suspicious" Repository Allocation Units (RAUs) 42R are in the Container 18a. The data contents of Suspense Elements 68a are then compared to the data residing in the Repository Allocation Units (RAUs) 42R in Flushing Buffer 68c and the suspended Data Units 56 either entered into DCSU 52B, with corresponding Record Entries 64 written into MDC Table 60, if the data does not match, or discarded if the data does match.

The operations executed in Step 54e that are performed when a duplicate of the data in a new Data Unit 56 may already reside in a Container 18a of DCSU 52B may therefore be summarized as:

(a) writing the new Data Unit 56 and, for example, its Hash Value 58, and the location of the possibly matching Repository Allocation Units (RAUs) 42R into a Suspense Array 68b;

(b) subsequently, and after sorting Suspense Elements 68a according to the locations of the possibly matching Repository Allocation Units (RAUs) 42R, locating and reading from DCSU 52B as many previously existing Repository Allocation Units (RAUs) 42R possible matching the suspended Data Unit 56 as may be contained in Flushing Buffer 68c;

(c) comparing the data of the suspended Data Units 56 with the data of the Repository Allocation Units (RAUs) 42R already represented in MDC Table 60; and (d) adding a Record Entry 64 for the new Data Unit 56 if the data does not match; or (e) discarding the new Data Unit 56 if the data does match; and, (f) repeating these steps until all Suspense Elements 68a have been processed.

The use of a Suspense Array 68a and a Flushing Buffer 68c in the presently preferred embodiment of DCM 52A, as described below, thereby allows these processes to fetch and process a number of suspended Data Units 56 in a single read operation, rather than a series of read operations, thereby significantly increasing the speed of operation of DCM 52A.

Figure 7:
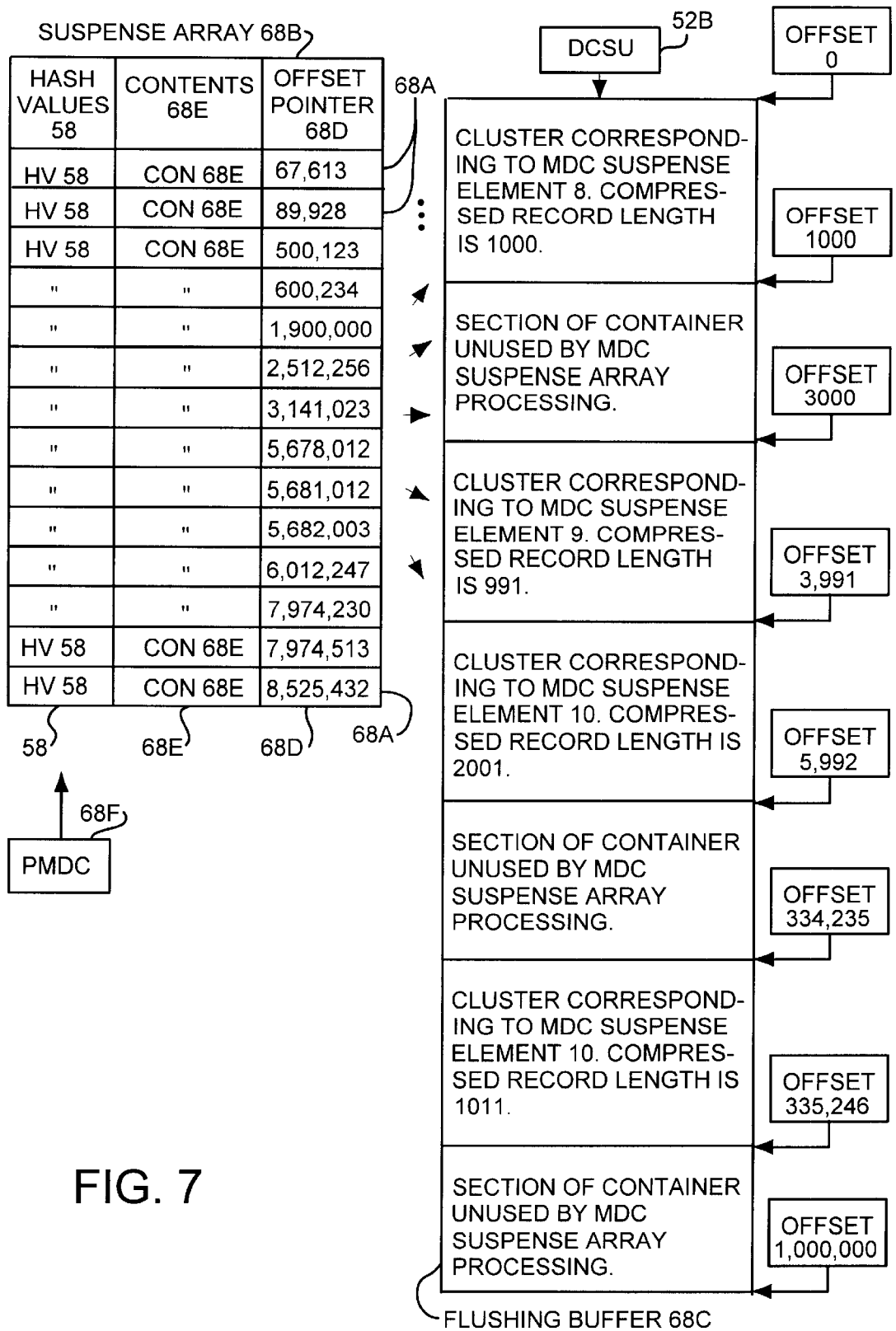
FIG. 7 is a diagrammatic representation of a suspense array of the present invention.

Referring to FIG. 7, therein is shown a diagrammatic representation of a Suspense Array 68b as implemented in the presently preferred embodiment of DCM 52A. As described, Suspense Array 68b is an array of Suspense Elements 68a wherein each Suspense Element 68a corresponds to an incoming Data Unit 56 that may contain data that has already been stored in a Repository Allocation Units (RAUs) 42R in a Container 18a of Data Repository 18 and that has a Hash Value 58 that collides with the Hash Value 58 of a Repository Allocation Unit (RAU) 42R.

As illustrated in FIG. 7, each Suspense Element 68a includes a Pointer 68d to the location in DCSU 52B of a Repository Allocation Unit (RAU) 12R having a Hash Value 58 that collides with, that is, matches, the Hash Value 58 of the suspended/suspected Data Unit 56 represented by the Suspense Element 68a. In the present embodiment, each Pointer 68d is an offset from the start of DCSU 52B of the corresponding Repository Allocation Unit (RAU) 12R. Each Suspense Element 68a also includes the Contents (Con) 68e, that is, data, of the corresponding suspended Data Unit 56, and may include, for example, and for processing convenience, the Hash Value (HV) 58 of the suspended Data Unit 56. Each Suspense Element 68a may also include, again for processing convenience, such information as the location of the suspended Data Unit 56 in Source Allocation Units (SAUs) 42S.

Associated with Suspense Array 68d in the presently preferred embodiment is a large buffer, identified and described above as Flushing Buffer 68c, that resides in memory and that is used to hold the contents of some or all of the Repository Allocation Units (RAUs) 42R that correspond to the Suspense Elements 68a in sorted Suspense Array 68d. As indicated, MDC 52A additionally maintains an index pointer, indicated as pMDC 68f, that is associated with Suspense Array 68d and points to the next collection of Suspense Elements 68a to be read into Flushing Buffer 68c. In this regard, it should be noted that it is possible for Suspense Array 68b to have only a single Suspense Element 68a in the collection, but that this would be relatively rare because if it was not rare then this optimization would not offer a performance improvement.

Referring now to FIGS. 8, 9, 10 and 11, therein are shown flow diagrams of the operation of DCM 52A in executing Step 54e as described above.

Figure 8:
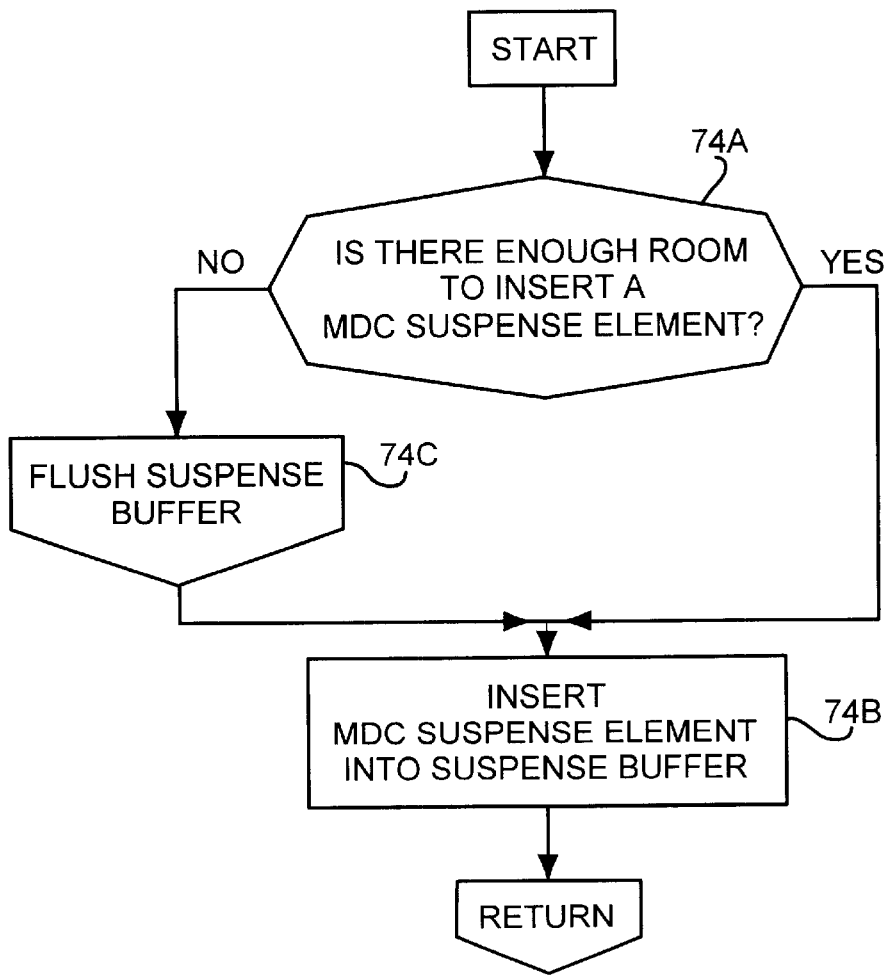
FIG. 8 is a flow diagram of the insertion of a suspense element into a suspense array of the present invention.

Referring first to FIG. 8, therein is represented the overall operation of DCM 52A in executing Step 54e, which includes:

Step 74a: Upon identifying a match between the Hash Value 58 of a new Data Unit 56 and a Hash Value 58 already represented in an MDC Record 62 of an MDC Table 60, determine whether there is sufficient room in Suspense Array 68b to insert a new Suspense Element 68a. Go to Step 74b if the result is yes and to Step 74c if the result is no.

Step 74b: If there is sufficient room in Suspense Array 68b to insert a new Suspense Element 68a, insert the Suspense Element 68a into Suspense Array 68b and go to the conclusion of Step 54e of FIG. 4.

Step 74c: If Suspense Array 68b does not have sufficient room to contain a new Suspense Element 68a, that is, Suspense Array 68b is full, go to Step 76a of the flow diagram shown in FIG. 9 to flush Suspense Array 68b, that is, process Suspense Elements 68a, and, when that process is completed and returns to Step 74c, proceed to Step 74b to conclude this process as described in Step 74b.

Figure 9:
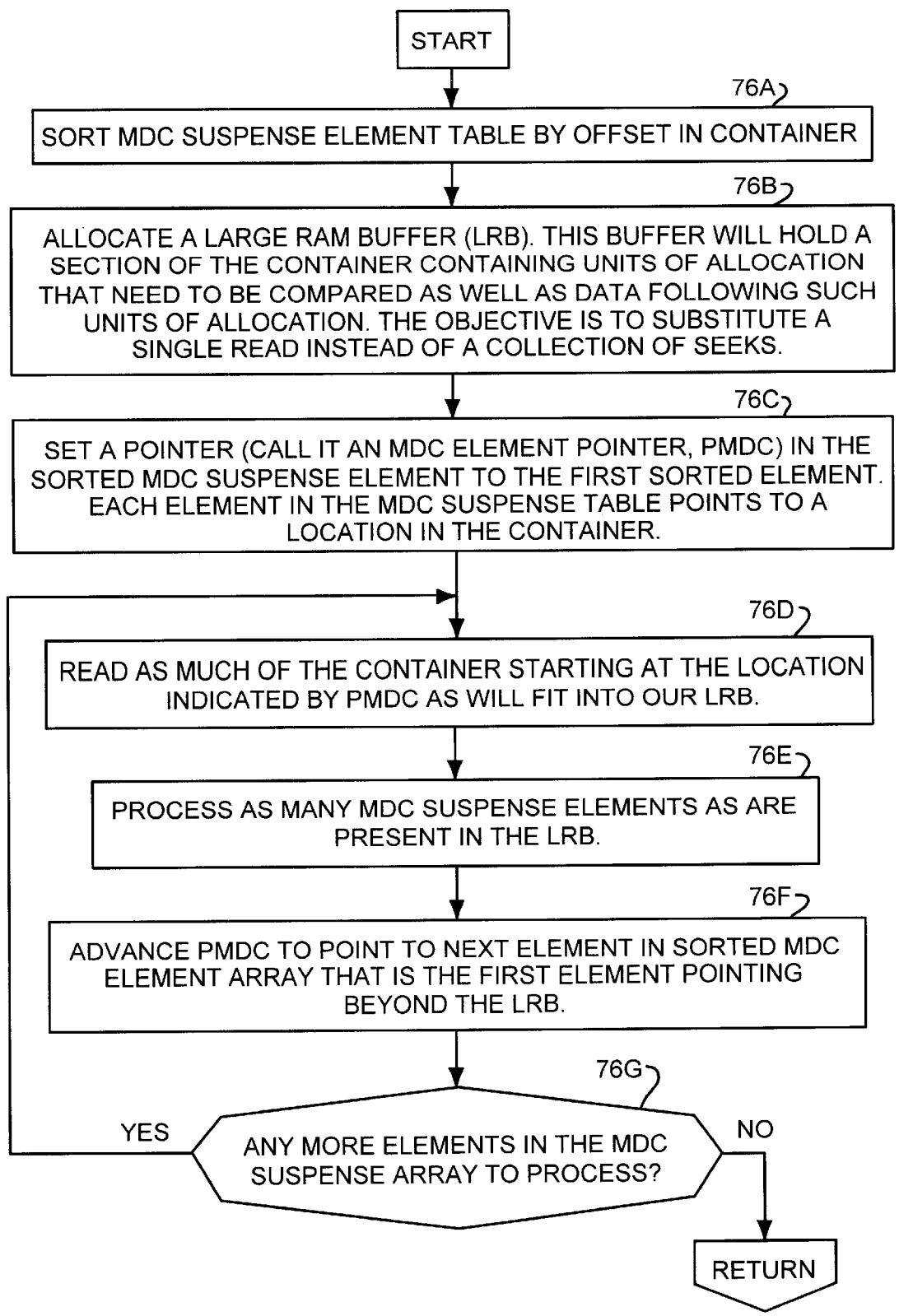
FIG. 9 is a flow diagram of the flushing of a suspense array of the present invention.

Referring to FIG. 9, therein is illustrated the process for flushing Suspense Array 68b, which is reached from Step 74c if there is not sufficient room in Suspense Array 68d for a new Suspense Element 68s. The Suspense Array 68b flushing process includes the steps of:

Step 76a: Sort Suspense Array 68b, that is, Suspense Elements 68a, by the offsets of Suspense Elements 68a in Container 68a as represented by Pointers 68d.

Step 76b: Allocate a Flushing Buffer 68c to hold part or all of Suspense Elements 68a. It is considered preferable that Flushing Buffer 68c should be as large as reasonable to allow the process to be executed as a single read or as few as reads as possible, rather than as a number of seek/read operations.

Step 76c: Set pMDC 68f to point to the first sorted Suspense Element 68a.

Step 76d: Read as much as possible of the Repository Allocation Units (RAUs) 42R that correspond to Suspense Elements 68a from Container 18a into Flushing Buffer 68c, starting at the location indicated by pMDC 68f.

Step 76e: Process as many Suspense Elements 68a and the corresponding Repository Allocation Units (RAUs) 42R that are resident in Flushing Buffer 68c and are represented by the sorted elements in Suspense Array 68d, following the process illustrated in FIG. 10. As will be described below, the processes illustrated in FIG. 10 and in the related FIG. 11 determine whether the data of a Suspense Element 68a matches the data of a Repository Allocation Unit (RAU) 12R already represented in an MDC Record 62 of an MDC Table 60, and thus in a Container 18a of Data Repository 18, and either discards the Suspense Element 68a if there is a data match or stores the Suspense Element 68a in a Container 18a of Data Repository 18 and creates corresponding entries in an MDC Table 60 if there is not a data match.

Step 76f: At the conclusion of the processing of the Suspense Elements 68a having corresponding Repository Allocation Units (RAUs) 42R in Flushing Buffer 68c, as illustrated in FIG. 10, advance pMDC 68f to the next Suspense Element 68a in the sorted Suspense Array 68b that is the first Suspense Element 68a having a Pointer 68d that points beyond the end of Flushing Buffer 68c, that is, is not currently resident in Flushing Buffer 68c.

Step 76g: Determine whether there are any more Suspense Elements 68a represented in the Suspense Array 68b to be processed. If the result is yes, return to Step 76d and continue the process and, if the result is no, return to the conclusion of Step 74c of FIG. 8.

Figure 10:
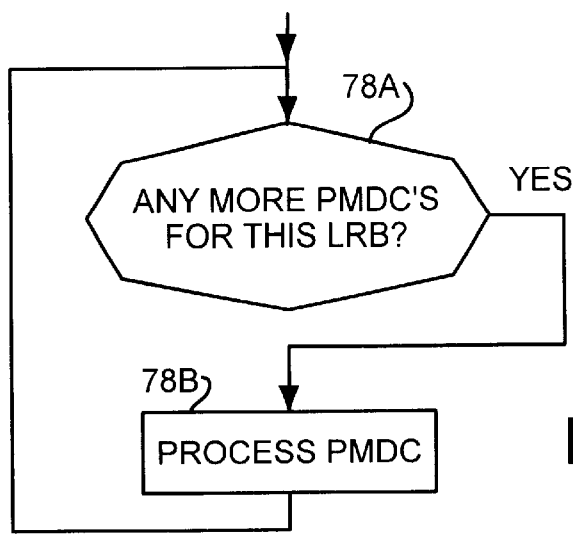
FIG. 10 is a flow diagram of the selection of suspense elements of a suspense array of the present invention; and, FIG. 11 is a flow diagram of the process for determining whether a suspense element matches an allocation unit stored in the data repository of the present invention.

Referring now to FIG. 10, this process is reached from Step 76e of FIG. 9 and is executed to process the Suspense Elements 68a represented in Flushing Buffer 68c. As described above, the processing of Suspense Elements 68a as illustrated in FIG. 10 and in the related FIG. 11 determines whether the data of a Suspense Element 68a matches the data of a Data Unit 56 already represented in MDC Table 60, and thus in a Container 18a of Data Repository 18. These processes either discard the new Data Unit 56 if there is a data match or store the new Data Unit 56 in a Container 18a of Data Repository 18 and create corresponding entries in MDC Table 60 if there is not a data match.

As shown in FIG. 10, this process is comprised of the steps of:

Step 78a: Determine whether there are any more Suspense Elements 68a represented in Flushing Buffer 68c to be processed. If the result is no, the process illustrated in FIG. 9 is completed and ends. If the result is yes, proceed to Step 76d.

Step 78b: Process the next Suspense Element 68a represented in Flushing Buffer 68c according to the process illustrated in FIG. 11 and, when the process illustrated in FIG. 11 is completed, return to Step 78a.

Figure 11:
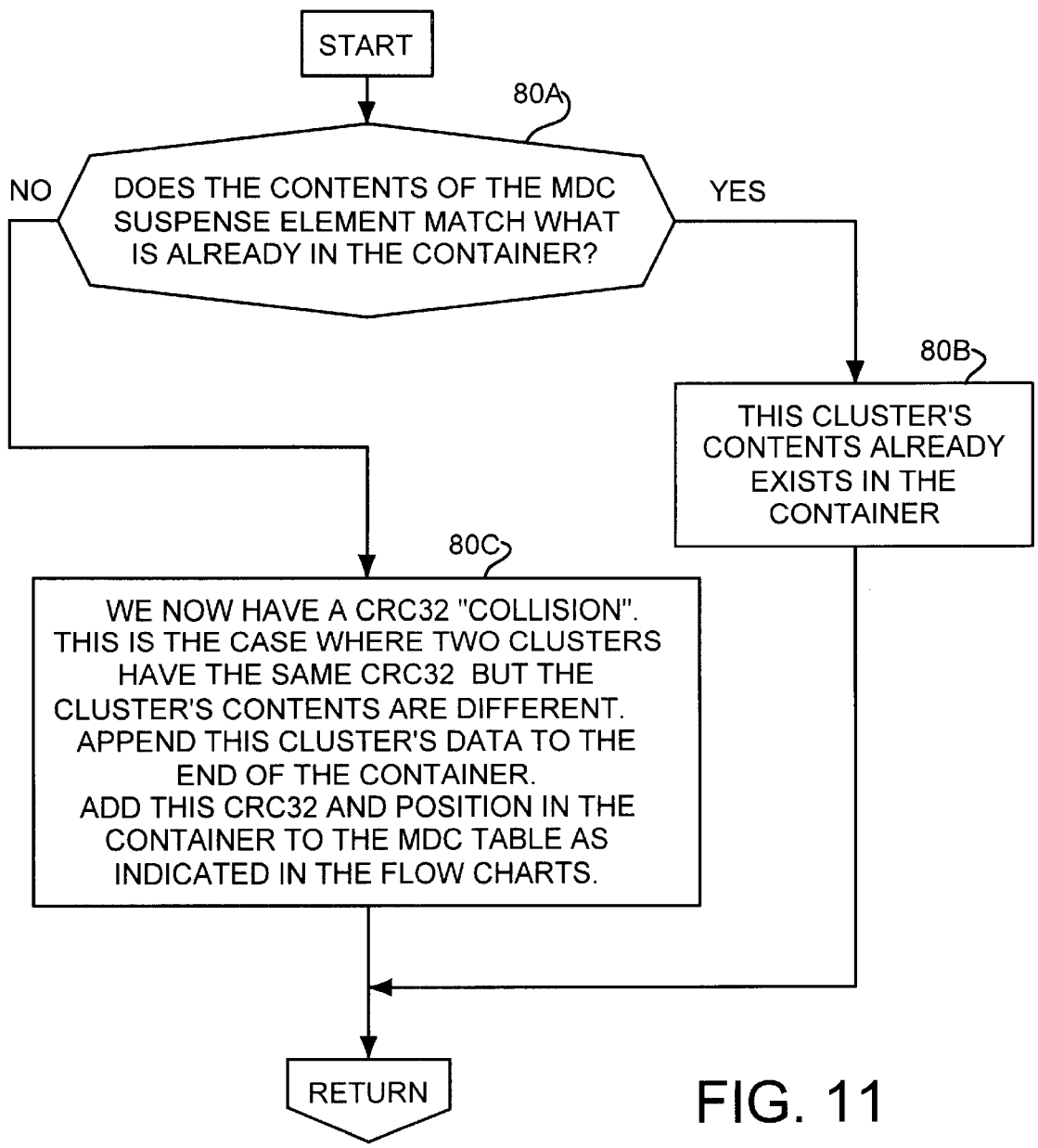

Referring now to FIG. 11, therein is represented the process for determining whether the data of a Suspense Element 68a matches the data of a Data Unit 56 already represented in MDC Table 60 and either discarding the new Data Unit 56 if there is a data match or storing the new Data Unit 56 in a Container 18*a* of Data Repository 18 and creating a corresponding entry in an MDC Table 60 if there is not a data match. This process is reached from Step 78*b* of FIG. 10 and is comprised of the steps of:

Step 80*a*: Compare the contents, that is, the data, of the Suspense Element 68*a* with the contents of the corresponding Data Unit 56 already residing in a Container 18*a* of Data Repository 18 and represented in a Repository Allocation Units (RAUs) 42R in the Flushing Buffer 68*c* at the appropriate offset in Flushing Buffer 68*c* as illustrated in FIG. 7. If the result is yes, the contents of this cluster, that is, the Data Unit 56 represented by the Suspense Element 68*a*, is already represented and exists in a Container 18*a* of Data Repository 18 and the Data Unit 56 represented by the Suspense Element 68*a* is to be discarded, and the process returns to the conclusion of Step 78*b* in FIG. 10. If the result is no, there is a "collision" of Hash Values 58, that is, there are two clusters, Data Units 56, having the same Hash Values 58 but different contents, and the process proceeds to Step 80*b*.

Step 80*b*: Append the data of the Data Unit 56, that is, the cluster represented by the Suspense Element 68*a*, to the end of the Container 18*a* and add a Record Entry 64 containing this Hash Value 58 and the location in Container 18*a* to MDC Table 60 as previously described. This completes the processing of a Suspense Element 68*a*, and the process returns to the conclusion of Step 78*b* of FIG. 10.

As has been described above, the invention described herein may be implemented in the form of a program controlled processor wherein, for example, DCM 52A is embodied in one or more programs controlling the processor of a System 12 in which the Data Repository 18 is implemented.

5. Alternate Implementations of the Present Invention

It will be appreciated and understood by those of ordinary skill in the relevant arts that, in addition to the program implementation of DCM 52A illustrated in the flow diagrams shown in FIGS. 4 through 11 and described herein above, portions or all of the functions and operations of DCM 52 may equally be implemented in dedicated purpose hardware, that is, in logic circuits. Such an implementation is illustrated in FIG. 3, the components of which have been described in the discussions of FIGS. 4 through 11, and the conversion of any or all of the functions and operations of DCM 52 into such logic circuitry will be well understood by those of ordinary skill in the relevant arts.

In addition, the present invention has been generally described herein above as a system data repository implemented, for example, in a single user system or in a user system operating, at least in part, as a data repository for a system node or for the processors of a networked system. It will be appreciated and understood by those of ordinary skill in the relevant arts, however, that the data compression mechanism of the present invention may be implemented in other forms and for other applications and in any application in which data compression is desired.

For example, the data compression methods and apparatus of the present invention may be implemented within a mass storage device, such as a disk drive, or within a mass storage array, such as an array of disk drives operating together and controlled by a single control mechanism to appear to a system as a single very large disk drive. In this respect, it will be noted that the control mechanisms of mass storage devices such as disk drives and disk arrays, which may generally referred to as the device or device array controller, may reside within, for example, the device or device array, or may be external to the device or device array. It will also be understood that the control mechanisms for mass storage devices and may be implemented in a number of ways, such as by program control of a processor or in dedicated purpose hardware or in any combination thereof. The adaptation and implementation of the present invention to function within such mass storage devices will, however, be apparent to those of ordinary skill in the relevant arts from the above descriptions of the present invention.

The implementation of the present invention within a storage device, again such as a disk drive or disk drive array, offers significant advantages. For example, when the storage device is serving as the storage device of a network server, the apparent storage available to the network will be increased, often dramatically, depending on the redundancy of the programs and data of the user or users of the storage device. In addition, the addition of the present invention to a storage device requires few, if any, changes to the components and operations of the storage device.

To illustrate by an example, the host processor for a mass storage device such as a disk drive or a disk array, which may be the device controller or one or more host systems having access to the storage device, typically includes a demand paging and memory management facility generally similar to those described herein as embodied in File Manager 40, Storage Manager 36 and Storage Unit Driver 30. The demand paging and memory management facility operates to relate and translate virtual or logical addresses generated by application and operating systems programs into physical addresses of data or program code, hereafter referred to generally as "data", in the system. The physical addresses may be of locations in system memory or in the mass storage device and, in the latter case, will typically include at least an identification of the mass storage device on which the data resides and information allowing the data to be located in the mass storage device. As well understood by those knowledgeable in the arts, the specific manner in which logical addresses are translated from the logical level to the detailed physical level, and the levels of translation performed at each step, depends upon the distribution of "intelligence" and functions among the components of a particular system. As well understood, a logical address may generally be expressed as a logical identification of a data file or other body of data plus an offset into the data item and a length of the data to be read or written, while a physical address on a disk drive may, at the most detailed level, be generally expressed as a drive identification plus the identifications of the tracks, sectors and segments in which the data resides. In some systems there is little "intelligence" in the storage devices and the translation from a logical address to physical disk drive address is performed at a high level, for example, as part of operating system memory management functions. In other systems, the disk drives are provided with a significant degree of internal "intelligence" and, for example, maintain tables relating the logical identifications of data stored in the devices to the tracks, sectors and segments of the devices containing the data. As such, the system may access a given data file by providing to the storage device an identifier of the device and an identifier of the data, whereupon device controller accesses its tables to identify the tracks, sectors and segments containing the data and the data is transferred into memory where specific data within the file may be accessed.

However implemented, a system or the device controller will have the facilities to relate a logical data identification, such as a file name, to the tracks, sectors and segments in the storage device where the data resides and to perform certain storage management fuctions, such as tracking the amount of storage capacity in use, allocating storage space and freeing unused storage space. For these purposes, the system or the device controller will typically maintain an address translation table to store the information necessary to translate logical to physical address and a table or tables to manage the use of the storage space in the storage device, such as the sectors in a disk drive.

In a typical implementation of the present invention within a storage device such as a disk drive, disk array, optical disk drive, the data compression method and apparatus of the present invention is implemented within the storage device in the address translation and storage space management facilities of the storage device.

An example of a typical implementation of the present invention in a storage device, such as a disk drive or a disk drive array may be illustrated with reference to FIG. 3, wherein it will be understood that, for purposes of this illustration, Resource Allocation Units (RAUs) 42R are represented by, for example, sectors of a disk drive. It is assumed, in the present example, that the mechanisms of the present invention, including MDC Table 60, Hash Gen 52AB, Table Search 52AC, Table Gen 52AD and, if necessary and depending on the implementation and functions of the storage device, RESTRUCT 52AA, Suspense Processor 52AE and Suspense Array 68*b*, are implemented in the device controller one level up from the physical sector layer of control. In this respect, it will be understood that the mechanisms of the present invention may be implemented in processor control programs, as dedicated hardware elements, or as a mixture thereof, again depending on the specific implementation of the storage device and the choices of the designer.

As is well known and understood, a disk drive, at a low level of its control and management functions, maintains a pool of allocation units, typically sectors. The sectors are generally identified sequentially by numbers 0 through N, where N is the physical number of sectors on the disk drive. At the next level up in the control and management functions of the device, the device would present to the outside world a storage device with V sectors where V>=N and wherein V-N represents the number of redundant sectors in the system.

Upon receiving an incoming Data Unit 56, which in this example would be, for example, a sector, having an address as sector 100, the device would perform an associative array search for this sector in the collection of sectors in the system being served by the device. As a proxy for performing such an associative array search of the system, a Hash Value 56 is computed by Hash Gen 52AB for the incoming sector, using, for example, an algorithm such as MD5, which has a low collision rate, and MDC Table 60 is searched in the manner described herein above. If the associative array search finds that this sector exists in the pool of sectors maintained by the device, then a pointer to this sector is placed in MDC Table 60 in the manner described. If the associative array search finds that this sector does not exist in the pool, then this sector is written to the next available element of the lowest level sector pool and a corresponding entry made in MDC Table 60, again in the manner described herein.

The operation of the present invention as implemented within a storage device may be illustrated in further detail by considering the case of a newly initialized disk with no data on it and with an incoming Data Unit 56, that is, sector, having a logical address of sector 100. The device would analyze the incoming logical sector 100 and perform an associative array search for this sector. Since the system is newly initialized, such a search will fail. The device will then, and as a result of the failed search, map the incoming sector having a logical sector 100 to, for example, physical sector 0 of the disk, although it will be understood that the device could map the logical sector to any physical sector. The device controller will, in addition, mark the logical sector 100/physical sector 0 with a "use count" of 1 wherein, as will be understood by those of skill in the relevant arts, sector use counts are information maintained by a device controller as part of the device controller storage space management functions.

The device controller may then be presented with a new incoming Data Unit 56, that is, sector, having a logical address of 2002, and the contents of logical sector 2002 may identical to the contents of logical sector 100. The device controller would perform the array search through MDC Table 60 as described above and, if the contents of logical sector 2002 were found to be identical to the contents of logical sector 100, which already exists in the pool of sectors, the device controller would map logical sector 2002 to physical sector 0 and increase the use count of physical sector by 1 so that its current value is 2.

If the device controller then received a read request for logical sector 100, the device controller would then use logical to physical mapping hardware, which is comprised of MDC Table 60 and Hash Gen 52AB, Search Table 52AC, and Table Gen 52AD, to present the contents of physical location 0 to the requester. In a like manner, if the device controller received a read request for logical sector 2002, the device controller would again use the logical to physical mapping hardware comprised of MDC Table 60 and Hash Gen 52AB, Search Table 52AC, and Table Gen 52AD to present the contents of physical location 0 to the requester.

If logical sector 100 is then written again, but with different contents, the device controller would again generate a Hash Value 56 and again perform an associative array search for this sector in the already existing sector pool of the storage device. If the contents of the new sector 100 do not already exist in the storage device, the search will fail. The device control will allocate a new sector from the physical pool, such as physical sector 1, and use the mechanisms of the present invention to generate a corresponding entry in MDC Table 60, with logical sector 100 now being represented by the newly allocated physical sector. The device controller will decrement the use count associated with physical sector 0 by 1 as physical sector 0 no longer represents logical sector 100, so that current use count value of physical sector 0 will be 1, representing logical sector 2002. The device controller will also set the use count of the newly allocated physical sector to 1, representing the use of the physical sector by the new logical sector 100.

It will be apparent from the above that the storage device will present an increasingly larger storage capacity as the use counts of the sectors increase, and that the apparent total storage of the device would be the sum of the use counts plus the sum of the unallocated sectors from the physical pool. It is therefore possible that such a storage device in which the present invention is implemented would present an apparent storage size many hundreds of times larger than the physical storage available.

In conclusion, and while the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. For example, the method may be used to compress and store the data residing in clusters from a plurality of data sources, such as the nodes of a networked computer system, or from a data source that resides in a system that is separate from the data repository, or from a data source that resides in the same system as the data repository. It will also be apparent that other compression methods, such as in-line data compression algorithms, may be used in combination with the methods of the present invention, and that a number of devices, such as hard disks, optical disk drives or a hard disk being simulated by other software such as Stacker®, TAPEDISK®, DATMAN® or other software hard disk emulators, may be used as a data storage device for the data repository. It will be further understood that the method of the present invention may be utilized with a conventional file manager and storage manager, rather than with containers and compartments, and that the components of DCM 52A may be structured and organized differently from those shown in FIG. 3, depending on the preferences and design choices of the implementer. Still further, it will be apparent to those of ordinary skill in the relevant arts that the mechanisms of the present invention may be implemented in processor control programs, as dedicated hardware elements, or as a mixture thereof, again depending on the specific embodiments of the storage devices, the requirements of each specific embodiment of the present invention, and the choices of the designer. For example, the hash generator and table lookup mechanisms may be implemented by associative array hardware Therefore, it is the object of the appended claims to cover all such variation and modifications of the invention as come within the true spirit and scope of the invention.

What is claimed is:

1. In a computer system including at least one data source wherein data is stored in source allocation units and a data repository having access to the data source and including a storage device for storing data in repository allocation units, a method for storing data from the data source in the storage device of the data repository, comprising the steps of:

(a) reading data from the source allocation units and restructuring the data into data unit having a size corresponding to the repository allocation units;

(b) for each data unit read from the data source, generating a hash value for the data of each data unit;

(c) for each data unit read from the data source,
searching a data table for a table entry having a hash value matching a hash value of the data unit read from the data source, wherein
each table entry contains the hash value of a data unit stored in a repository allocation unit and a repository allocation unit pointer to the corresponding repository allocation unit;

(d) when the hash value of a data unit does not match any hash value of any table entry in the data table,
writing the data of the data unit into a newly allocated repository allocation unit,
generating a new table entry containing the hash value of the data unit and a repository allocation unit pointer to the newly allocated repository allocation unit, and
writing the new table entry containing the hash value and a repository allocation unit pointer to the newly allocated repository allocation unit to the data table;

(e) when the hash value of a data unit matches the hash value of a data entry in the data table,
accessing the table entry having a matching hash value and using the repository allocation unit pointer therein to read the data of the corresponding repository allocation unit, and
comparing the data of the data unit and the data of the corresponding repository allocation unit,
if the data of the data unit matches the data of the corresponding repository allocation unit,
discarding the data unit, and
if the data of the data unit does not match the data of the corresponding repository allocation unit,
writing the data of the data unit into a newly allocated repository allocation unit,
generating a new table entry containing the hash value of the data unit and a repository allocation unit pointer to the newly allocated repository allocation unit, and
inserting the new table entry into the data table; and, (f) repeating steps (a) through (e) until all source allocation units have been read.

2. The method of claim 1 for storing data from the data source in the storage device of the data repository, wherein:
the source allocation units are clusters of a storage device.

3. The method of claim 1 for storing data from the data source in the storage device of the data repository, wherein:
the source allocation units are sectors of a storage device.

4. The method of claim 1 for storing data from the data source in the storage device of the data repository, wherein:
a repository allocation unit pointer is a byte offset of the location of a repository allocation unit from the beginning of the repository allocation units in the storage device of the data repository.

5. The method of claim 1 for storing data from the data source in the storage device of the data repository, wherein:
the data table is partitioned into data records wherein each data record contains an array of table entries containing at least one table entry.

6. The method of claim 5 for storing data from the data source in the storage device of the data repository, wherein step (c) includes the steps of:

(c1) fetching a first/next data record;

(c2) determining whether the fetched first/next data record is the last data record of a linked list of one or more data records in the data table wherein the last data record of the data table is not sorted according to the hash values represented therein, and
going to step (c3) when the fetched first/next data record is not the last data record of the data table, and
going to step (c5) when the fetched data record is the last data record of the data table;

(c3) determining whether the hash value of the newly received data unit is smaller than the hash value of the first table entry of the data record, and
when the hash value of the newly received data unit is smaller than the hash value of the first table entry, going to step (c1), and
when the hash value of the newly received data unit is not smaller than the hash value of the first table entry, going to step (c4);

(c4) determining whether the hash value of the newly received data unit is larger than the hash value of the last table entry of the data record, and
when the hash value of the newly received data unit is larger than the hash value of the last table entry of the data record, going to step (c1), and when the hash value of the newly received data unit is not larger than the hash value of the last table entry of the data record, going to step (c6);

(c5) performing a linear search to find a match between the hash value of the newly received data unit and the hash value of a table entry in the data record, and when a match between the hash value of the newly received data unit and the hash value of a table entry in the data record is not found, returning to step (d), and when a match between the hash value of the newly received data unit and the hash value of a table entry in the data record is found, returning to step (e).

(c6) performing a binary search to find a match between the hash value of the newly received data unit and the hash value of a table entry in the data record, and when a match between the hash value of the newly received data unit and the hash value of a table entry in the data record is not found, returning to step (d), and when a match between the hash value of the newly received data unit and the hash value of a table entry in the data record is found, returning to step (e).

7. The method of claim 5 for storing data from the data source in the storage device of the data repository, wherein step (d) includes the steps of:

(d1) determining whether a data record exists to receive the table entry of the newly received data unit, and
if a data record does not exist to receive the table entry, going to step (d2), and
if a data record exists to receive the table entry, going to step (d3);

(d2) creating a new data record to receive the table entry of the newly received data unit, (d3) determining whether the data record has space to receive a new table entry, and
if the data record has space to receive a new table entry, going to step (d6), and
if the data record does not have space to receive a new table entry, going to step (d4);

(d4) sorting the last data record according to the hash values of the record entries appearing therein;

(d5) creating a new data record to be a new last data record of the data table, and linking the new last data record to the chain of one or more data records of the data table;

(d6) inserting the new table entry into the last data record of the data table, and returning to step (d).

8. The method of claim 1 for storing data from the data source in the storage device of the data repository, wherein step (e) includes the steps of:

(e1) upon identifying a match between the hash value of a new data unit and a hash value already represented in the data table, determining whether there is sufficient room in a suspense array to insert a new suspense element wherein
the suspense array includes one or more suspense elements, and
a suspense element contains the data of a new data unit having a hash value that matches the hash value of a table entry residing in the data table, and (e2) if there is room in the suspense array to insert a new suspense element, going to step (e3), and if there is not room in the suspense buffer to insert a new suspense element, going to step (e4);

(e3) inserting the new suspense element into the suspense array, and
returning to step (e);

(e4) flushing the suspense buffer by
reading each suspense element of the suspense array and, for each suspense element,
accessing the table entry having a matching hash value and using the repository allocation unit pointer therein to read the data of the corresponding repository allocation unit, and
comparing the data of the data unit represented by the suspense element and the data of the corresponding repository allocation unit, and
if the data of the suspense element matches the data of the corresponding repository allocation unit, discarding the data unit, and
if the data of the suspense element does not match the data of the corresponding repository allocation unit,
writing the data of the data unit into a newly allocated repository allocation unit,
generating a new table entry containing the hash value of the data unit and a repository allocation unit pointer to the newly allocated repository allocation unit, and
inserting the new table entry into the data table, and
returning to step (e).

9. The method of claim 8 for flushing the suspense buffer, wherein step (e3) includes the steps of:

(e3-a) sorting the suspense array by the repository allocation unit pointers to the repository allocation units of the suspense elements in the suspense buffer;

(e3-b) allocating a flushing buffer to store at least one of the suspense elements stored in the suspense array;

(e3-c) setting a suspense array index pointer to point to the first sorted suspense element;

(e3-d) reading suspense elements from the repository into the flushing buffer, starting with the suspense element indicated by the suspense array index pointer;

(e3-e) processing each allocation unit corresponding to each suspense element in the flushing buffer by
comparing the data of the data unit represented by a suspense element and the data of the corresponding repository allocation unit, and
if the data of the suspense element matches the data of the corresponding repository allocation unit, discarding the data unit, and
if the data of the suspense element does not match the data of the corresponding repository allocation unit, writing the data of the data unit into a newly allocated repository allocation unit,
generating a new table entry containing the hash value of the data unit and a repository allocation unit pointer to the newly allocated repository allocation unit, and
inserting the new table entry into the data table;

(e3-f) after processing each suspense element in the flushing buffer, advancing the suspense array index pointer to the next suspense array entry representing a suspense element in the suspense buffer that has not been processed, and return to step (e3-d);

(e3-g) when there are no more suspense elements in the flushing buffer to be processed, returning to step e.

10. The method of claim 9 for flushing the suspense array, wherein the method for determining whether the data of a suspense element matches the data of a data unit already represented in a table entry of a data table and residing in a repository allocation unit of step (e3-3) includes the steps of:

(e3-3a) comparing the contents of a data unit represented in a suspense element with the contents of a data unit already residing in a repository allocation unit and represented in a table entry of a data table, if the contents of the data unit in the suspense element match the contents of the data unit already residing in a repository allocation unit and represented in a table entry, discarding the data unit in the suspense element, if the contents of the data unit in the suspense element do not match the contents of the data unit already residing in a repository allocation unit and represented in a data record, writing the data of the data unit to a newly allocated repository allocation unit and adding a corresponding table entry containing the hash value of the data unit and a repository allocation unit pointer to the location of the data unit in the newly allocated repository allocation unit to the data table, and returning to step (e3-f).

11. The method of claim 1 for storing data from the data source in the storage device of the data repository, wherein:

the repository allocation units are organized into one or more containers, each container is organized into one or more compartments, and each compartment includes one or more repository allocation unit.

12. The method of claim 11 for storing data from the data source in the storage device of the data repository, further including:

a compartment set file associated with a container, the compartment set file containing a list of compartments that are to be treated as a single file.

13. In a computer system including at least one data source wherein data is stored in source allocation units in clusters of the data source and a data repository having access to the data source and including a storage device for storing data in repository allocation units, a data compression mechanism for storing data from the data source in the storage device of the data repository in compressed form by eliminating duplicate clusters of the data source, comprising:

a restructing mechanism for reading data from the source allocation units and restructuring the data into data units having a size corresponding to the repository allocation units;

a hash generator for generating a hash value for the data of each data unit read from the data source;

a table search mechanism responsive to each new data unit read from the data source for searching a data table for a data record having a record entry having a hash value matching a hash value of the data unit read from the data source, wherein the data table includes at least one data record and each data record contains the hash value of a data unit stored in a repository allocation unit and a repository allocation unit pointer to the corresponding repository allocation unit;

a storage manager responsive to operation of the table search mechanism for writing a newly received data unit into a newly allocated repository allocation unit when the hash value of the newly received data unit does not match a hash value of a record entry in a data record, a table generator responsive to operation of the table search mechanism for generating a new record entry containing the hash value of the newly received data unit and a repository allocation unit pointer to the newly allocated repository allocation unit and writing the new record entry into a data record;

a suspense processor responsive to operation of the table search mechanism for writing the data of the newly received data unit and the corresponding hash value into a suspense element of a suspense buffer when the hash value of a newly received data unit matches the hash value of a record entry in a data record, and for each suspense element, accessing the record entry having a matching hash value and using the repository allocation unit pointer therein to read the data of the corresponding repository allocation unit, comparing the data of the data unit and the data of the corresponding repository allocation, and if the data of the data unit matches the data of the corresponding repository allocation unit, discarding the data unit, and if the data of the data unit does not match the data of the corresponding repository allocation unit, indicating the mismatch to the storage manager and the table generator, wherein the storage manager is responsive to the suspense processor for writing the data of the data unit into a newly allocated repository allocation unit, the table generator is responsive to the suspense processor for generating a new record entry containing the hash value of the data unit and a repository allocation unit pointer to the newly allocated repository allocation unit and writing the new record entry into a data record.

14. The data compression mechanism of claim 13, wherein:

the repository allocation units are organized into one or more containers, each container is organized into one or more compartments, and each compartment includes one or more repository allocation units.

15. The data compression mechanism of claim 14, further including:

a compartment set file associated with a container, the compartment set file containing a list of compartments that are to be treated as a single file.

16. In a mass storage device for storing data unit received from at least one data source and including a storage element for storing the data and a controller for controlling the storing of data in storage allocation units of the storage element, a data compression mechanism for storing the data in compressed form by eliminating the storing of duplicate data units, comprising:

a hash generator for generating a hash value for the data of each data unit received by the mass storage device;

a table search mechanism responsive to each new data unit for searching a data table for a table entry having a hash value matching the hash value of the new data unit, wherein each table entry contains the hash value of a data unit stored in the storage element and an indicator of the storage allocation unit containing the data unit;

a storage manager responsive to operation of the table search mechanism for writing a newly received data unit into a newly allocated storage allocation unit of the storage element when the hash value of the newly received data unit does not match a hash value of a table entry and discarding the newly received data unit when the hash value of the newly received data unit matches a hash value of a table entry, and a table generator responsive to operation of the table search mechanism when the hash value of the newly received data unit does not match a hash value of a table entry for generating a new table entry containing the hash value of the newly received data unit and an indicator of the newly allocated storage allocation unit containing the newly received data unit and writing the new record entry into the data table.

17. The mass storage device of claim 16 wherein the data compression mechanism further comprises:

a suspense processor responsive to operation of the table search mechanism for writing the data of the newly received data unit and the corresponding hash value into a suspense element of a suspense buffer when the hash value of a newly received data unit matches the hash value of a table entry, and for each suspense element, accessing the table entry having a matching hash value and using the indicator of the storage allocation unit containing the data unit therein to read the data of the corresponding repository allocation unit, comparing the data of the data unit and the data of the corresponding repository allocation, and if the data of the data unit matches the data of the corresponding repository allocation unit, discarding the data unit, and if the data of the data unit does not match the data of the corresponding repository allocation unit, indicating the mismatch to the storage manager and the table generator, wherein the storage manager is responsive to the suspense processor for writing the data of the data unit into a newly allocated repository allocation unit, the table generator is responsive to the suspense processor for generating a new record entry containing the hash value of the data unit and an indicator of the newly allocated storage allocation unit containing the data unit and writing the new table entry into the data table.

18. The mass storage device of claim 16 wherein the mass storage device is a disk drive including at least one magnetic disk storage element or solid-state mechanism or similar mass storage device and the repository allocation units are sectors of the magnetic disk storage element.

19. The mass storage device of claim 16 wherein the mass storage device includes at least one solid-state mass storage mechanism having storage space organized as repository allocation units.

20. The mass storage device of claim 16 wherein the hash generator and table lookup mechanisms are replaced by associative array hardware.

21. The method of claim 1, further comprising the steps of:

(g) mounting the contents of the repository allocation units of a data repository into a system as a restored disk volume having a directory structure identical to that of the data source, and accessing files on the restored disk volume from a software application using file system input/output calls.

* * * * *